United States Patent [19]
Mizoguchi et al.

[11] Patent Number: 5,610,749
[45] Date of Patent: Mar. 11, 1997

[54] MICROCOMPUTER CONTROL OPTICAL FIBER TRANSMISSION SYSTEM

[75] Inventors: Takatoshi Mizoguchi, Gojou; Kaoru Ozawa, Uda-gun, both of Japan

[73] Assignee: Sharp Kabushiki Kaisha, Osaka, Japan

[21] Appl. No.: 401,210

[22] Filed: Mar. 9, 1995

[30] Foreign Application Priority Data

Mar. 9, 1994 [JP] Japan .................................. 6-038370
Sep. 13, 1994 [JP] Japan .................................. 6-218673

[51] Int. Cl.$^6$ ............................................... H04B 10/20
[52] U.S. Cl. ........................... 359/167; 359/165; 359/166
[58] Field of Search ................................. 359/118, 152, 359/153, 164, 165, 166, 167, 173

[56] References Cited

U.S. PATENT DOCUMENTS

| | | | |
|---|---|---|---|
| 4,777,662 | 10/1988 | Nakata | 359/153 |
| 5,026,137 | 6/1991 | Tokumitsu | 359/152 |
| 5,319,488 | 6/1994 | Ishiwatari | 359/152 |
| 5,327,275 | 7/1994 | Yamane | 359/152 |
| 5,363,229 | 11/1994 | Sakurai | 359/167 |

FOREIGN PATENT DOCUMENTS

| | | | |
|---|---|---|---|
| 0202602 | 11/1986 | European Pat. Off. | 359/165 |
| 0350207 | 1/1990 | European Pat. Off. | 359/152 |
| 56-7540 | 1/1981 | Japan . | |
| 56-10748 | 2/1981 | Japan . | |
| 0179627 | 8/1986 | Japan | 359/166 |

*Primary Examiner*—Leslie Pascal
*Attorney, Agent, or Firm*—David G. Conlin; Brian L. Michaelis

[57] ABSTRACT

A master optical signal transmitter-receiver unit and slave optical signal transmitter-receiver units are connected in series for optical transmission by way of optical fibers. Each optical signal transmitter-receiver unit includes an optical connector for converting an optical signal to an electric signal and vice versa, an optical fiber switching circuit for switching the operation mode of the transmitter-receiver unit to thereby switch the data transmission direction, and a microcomputer. Each slave optical signal transmitter-receiver unit has a second optical connector connected to the first optical connector. The optical fiber switching circuits are under control of respective microcomputers. The microcomputer of each slave optical signal transmitter-receiver unit compares address data of the unit with address data received from the master optical signal transmitter-receiver unit. When the address data coincide with each other, the slave optical signal transmitter-receiver unit outputs data of itself toward the master optical signal transmitter-receiver unit or takes in data from the master optical signal transmitter-receiver unit.

16 Claims, 20 Drawing Sheets

Fig.22
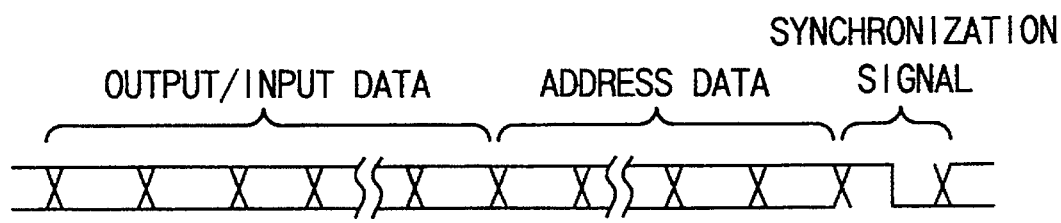
Fig.23
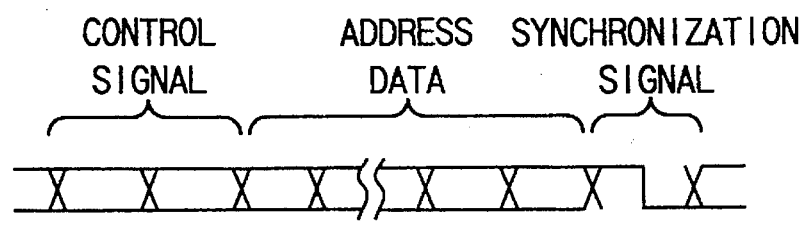
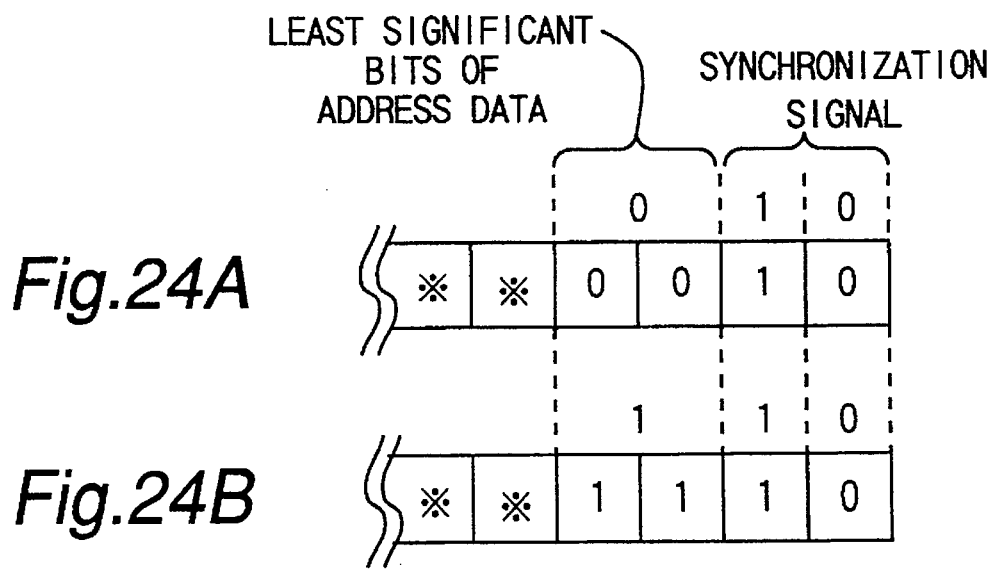
Fig.24A
Fig.24B
※ : ARBITRARY

1

MICROCOMPUTER CONTROL OPTICAL FIBER TRANSMISSION SYSTEM

BACKGROUND OF THE INVENTION

1. Field of the Invention

The present invention relates to an optical fiber transmission system for use in optical fiber communication between a main computer and its peripherals or subcomputers for household electric appliances, information apparatuses, production facilities, and the like.

2. Description of the Prior Art

Conventionally, as an optical fiber transmission system of the above-mentioned type, there has been a system provided with a single light emission section 37 and a plurality of photodetection sections 30, 31, and 32 as shown in FIG. 1, where the photodetection sections 30, 31, and 32 are connected to an optical fiber transmission line 33 via optical branch devices 34, 35, and 36 (Conventional Example 1).

In the above-mentioned conventional example, the optical branch devices 34, 35, and 36 have respective branching ratios designed to increase as the devices are closer to the light emission section 37 in order to transmit light emitted from the light emission section 37 evenly to the photodetection sections 30, 31, and 32. Therefore, disadvantageously, the larger the number of the photodetection sections is, the less the quantity of light received by each photodetection section results. Furthermore, the optical fiber transmission system of Conventional Example 1, has a low Optical coupling efficiency, and therefore the system is accompanied by a drawback that a lot of optical fiber transmission units can be hardly connected and used together.

As another conventional example, there is a system as disclosed in Japanese Patent Laid-Open Publication No. SHO 56-7540 (Conventional Example 2), which is shown in FIG. 2. This conventional example has optical fiber transmission lines 43, 44, 45, and 46 extending from a light emission section 47; optical filters 48, 49, and 50 provided between the optical fiber transmission lines 43 through 46; and photodetection sections 40, 41, and 42 provided for receiving light from the optical filters 48 through 50 via optical fibers 51, 52, and 53, respectively.

The above-mentioned light emission section 47 is comprised of a semiconductor laser device of which operation characteristics are shown in FIG. 3. As shown in FIG. 3, the semiconductor laser device emits laser light having discontinuous center wavelengths of $\lambda_1$, $\lambda_2$, and $\lambda_3$ according as an operation temperature or a drive current is changed.

The optical filters 48, 49, and 50 have their respective characteristics 54, 55, and 56, which are shown in FIG. 4, and extract light at the wavelengths of $\lambda_1$, $\lambda_2$, and $\lambda_3$ from the aforementioned optical fiber transmission lines. Then the light from the optical filters 48, 49, and 50 reach the photodetection sections 40, 41, and 42 via the optical fibers 51, 52, and 53, respectively.

Therefore, when the semiconductor laser device is made to emit light having the wavelength of, for example, $\lambda_2$ by changing its drive current, the light passes through the optical filter 48 without any substantial loss, and reaches the optical filter 49 via the optical fiber transmission line 44. Then most of the light having the wavelength of $\lambda_2$ is reflected on the optical filter 49, and reaches the photodetection section 41 via the optical fiber 52.

Therefore, in conventional Example 2, (1) because an optical signal from the light emission section 47 is not transmitted to any photodetection section other than the objective photodetection section, the quantity of light received by the objective photodetection section is greater than that of Conventional Example 1. Therefore, (2) optical transmission over a long distance can be achieved, and moreover, a lot of photodetection sections can be provided on the optical fiber transmission line. Furthermore, (3) by changing the wavelength of light emitted from the light emission section, the destination photodetection section to which an optical signal is desired to be transmitted can be easily selected.

The optical fiber transmission system of Conventional Example 2 can obtain an improved optical coupling efficiency. However, in order to specify a destination photodetection section which is the other party of the optical fiber transmission, it is required to constitute the light emission section 47 by a semiconductor laser and drive current changing means and interpose the optical filters 48, 49, and 50 between the optical fiber transmission lines 43, 44, 45, and 46. This arrangement is accompanied by a problem that a complicated optical transmission structure results and therefore that the costs increase.

Furthermore, the semiconductor laser is required to have the same number of center wavelengths as the number of the photodetection sections. Accordingly, there is a problem that there is a limitation in number of the receiving sections.

Next, FIG. 5 shows Conventional Example 3 which is disclosed in Japanese Patent Laid-Open Publication No. SHO 56-10748. This conventional example has a first optical transmitter-receiver 91, a second optical transmitter-receiver 92, and an optical fiber 72. The first optical transmitter-receiver 91 has an optical transmitter 61, an optical receiver 74, an optical filter 63, and a two-way separating circuit 71. The second optical transmitter-receiver 92 has an optical transmitter 62, an optical receiver 75, an optical filter 64, and a two-way separating circuit 73. The optical filter 63 has a light transmittance characteristic T1 which is shown in FIG. 6, while the optical filter 64 has a light transmittance characteristic T2 as shown in FIG. 6.

The optical transmitters 61 and 62 have electric input terminals 69 and 70, drive circuits 65 and 66, and light emitting diodes 67 and 68, respectively. An electric signal inputted from each of the electric input terminals is amplified in the drive circuits, and then inputted to the light emitting diodes to be converted into an optical signal by the light emitting diodes. The light emitting diodes 67 and 68 have different emission light center wavelengths. In detail, as shown in FIG. 6, the light emitting diode 67 has an emission spectrum P1 having an emission light center wavelength of about 830 nm and an emission spectrum full-width at half maximum of about 45 nm. On the other hand, the light emitting diode 68 has an emission spectrum P2 having an emission light center wavelength of about 850 nm and an emission spectrum full-width at half maximum of about 45 nm. The emission spectrum P1 of the light emitting diode 67 and the emission spectrum P2 of the light emitting diode 68 are partially overlapping each other. The light emitting diodes 67 and 68 are GaAlAs light emitting diodes.

The optical receivers 74 and 75 have photodiodes 76 and 77, amplifier circuits 78 and 79, and electric output terminals 80 and 81, respectively. Light inputted to each of the photodiodes is converted into an electric signal in the photodiodes, and the resulting electric signal is amplified in the amplifier circuits and then transmitted to the electric output terminals.

The two-way separating circuit 71 transmits light from the optical transmitter 61 to the optical fiber 72, and does not transmit the light to the optical receiver 74. Further, the two-way separating circuit 71 transmits light from the optical fiber 72 to the optical receiver 74, and does not transmit the light to the optical transmitter 61. The two-way separating circuit 73 transmits light from the optical transmitter 62 to the optical fiber 72, and does not transmit the light to the optical receiver 75. Further, the two-way separating circuit 73 transmits light from the optical fiber 72 to the optical receiver 75, and does not transmit the light to the optical transmitter 62.

According to the Conventional Example 3, when an electric signal is inputted from the electric input terminal 69 of the optical transmitter 61, the electric signal is transmitted through the driving circuit 65 and then makes the light emitting diode 67 emit light. The light emitted from the light emitting diode 67 is inputted to the optical filter 63 and only an emission spectrum corresponding to T1 in FIG. 6 is allowed to pass through the filter and then inputted to the two-way separating circuit 71. Then the light is outputted from the two-way separating circuit 71 to the optical fiber 72, then to the second two-way separating circuit 73, and then to the second optical receiver 75. The light inputted to the second optical receiver is extracted in a form of an electric signal from the electric output terminal 81 by way of the photodiode 77 and the amplifier circuit 79.

In the Conventional Example 3, the center wavelength $\lambda_1$ of the emission spectrum P1 of the first light emitting diode 67 and the center wavelength $\lambda_2$ of the emission spectrum P2 of the second light emitting diode 68 are close to each other. However, the emission spectrum of the light which has been emitted from the first light emitting diode 67 and passed through the first optical filter 63 and the emission spectrum of the light which has been emitted from the second light emitting diode 68 and passed through the second optical filter 64 are substantially not overlapping each other. Therefore, due to the difference of the emission spectrums, the light from the first light emitting diode 67 and the light from the second light emitting diode 68 can be separated by the two-way separating circuits 71 and 73.

The optical fiber transmission system of Conventional Example 3 can also obtain an improved optical coupling efficiency. However, the optical transmitter-receivers 91 and 92 are obliged to surely separate the light transmitted from the optical transmitter-receivers to the optical fiber 72 from the light transmitted to the optical transmitter-receivers by way of the optical fiber 72. Therefore, the optical transmitter-receivers 91 and 92 are each required to have a light emitting diode exhibiting an emission spectrum different from that of the other optical transmitter-receiver, an optical filter, and a two-way separating circuit. This results in a complicated optical transmission structure, increasing the costs.

SUMMARY OF THE INVENTION

The object of the present invention is therefore to provide an inexpensive optical fiber transmission system which has a simple structure and a good optical coupling efficiency and is easy to use.

In order to achieve the aforementioned object, the present invention provides an optical fiber transmission system comprising a plurality of optical signal transmitter-receiver units provided in a master unit and a plurality of slave units and connected serially by way of a plurality of optical fibers for transmitting and receiving an optical signal by way of the optical fibers, thereby allowing an optical communication to be achieved between the master unit and the plural slave units, wherein:

(a) the optical signal transmitter-receiver unit connected to the master unit comprises:

an optical connector which is connected to another optical signal transmitter-receiver unit by way of the optical fiber for converting an optical signal inputted from the optical fiber into an electric signal and converting an electric signal into an optical signal to output the optical signal to the optical fiber; and a send/receive mode switching circuit which is able to switch between a receive mode for receiving an electric signal from the optical connector and a transmit mode for transmitting an electric signal to the optical connector, and (b) the optical signal transmitter-receiver units connected to the respective slave units each comprise:

first and second optical connectors connected respectively to a preceding-stage optical signal transmitter-receiver unit and a succeeding-stage optical signal transmitter-receiver unit by way of the optical fibers for converting an optical signal inputted from the respective optical fiber into an electric signal and converting an electric signal into an optical signal to output the optical signal to the respective optical fiber; and a transmit mode switching circuit which is able to switch between a first transmit mode for receiving an electric signal from the first optical connector and transmitting the electric signal to the second optical connector and a second transmit mode for receiving an electric signal from the second optical connector and transmitting the electric signal to the first optical connector.

In this system, each optical signal transmitter-receiver unit for a slave unit (or a master unit) for transmitting and receiving an optical signal by way of an optical fiber converts the optical signal into an electric signal by means of the optical connector. Then the electric signal is received by a transmit mode switching circuit (or a transmit/receive mode switching circuit).

On the other hand, the transmit mode (transmit/receive mode) switching circuit outputs an electric signal to the optical connector, and the optical connector converts the electric signal into an optical signal and outputs the optical signal to the optical fiber.

Therefore, according to the present invention, the optical signal transmitted to the optical fiber can be subjected to a signal processing by being converted into an electric signal in the optical connector. Furthermore, the electric signal obtained through the signal processing can be outputted to the optical fiber after being converted into an optical signal. Therefore, according to the present invention, no optical branching devices nor optical filters are necessary in contrast to the conventional examples. Consequently, the system is allowed to have a simple light transmission structure, to be inexpensive, and easily handled.

Furthermore, in the system of the first aspect of the present invention, the transmit/receive mode switching circuit of the slave optical signal transmitter-receiver unit has the first transmit mode for transmitting an electric signal from the first optical connector to the second optical connector as well as the second transmit mode for transmitting an electric signal from the second optical connector to the first optical connector. Therefore, a signal can be transmitted bidirectionally from the preceding stage to the succeeding stage or from the succeeding stage to the preceding stage.

In an embodiment, the optical signal transmitter-receiver unit for the master unit comprises a control circuit for controlling the transmit/receive mode switching circuit to switch to the transmit mode to output an electric signal to the optical connector via the transmit/receive mode switching circuit, or to the receive mode to receive an electric signal from the optical connector via the transmit/receive mode switching circuit; and wherein the optical signal transmitter-receiver unit for each of the slave units comprises a control circuit capable of performing a first control operation for switching the transmit mode switching circuit between the first transmit mode and the second transmit mode, and a second control operation for making the transmit mode switching circuit select the first optical connector or the second optical connector through communication with the transmit mode switching circuit and making the transmit mode switching circuit output an electric signal to the first optical connector or to the second optical connector.

In this system, the control circuit of the master unit optical signal transmitter-receiver unit switches the transmit/receive mode switching circuit to the transmit mode to output an electric signal to the optical connector via the transmit/receive mode switching circuit, or switches the transmit/receive mode switching circuit to the receive mode to receive an electric Signal from the optical connector via the transmit/receive mode switching circuit.

On the other hand, the control circuit of the slave optical signal transmitter-receiver unit switches the transmit mode switching circuit between the first transmit mode and the second transmit mode. Then, the control circuit communicates with the transmit mode switching circuit to make the transmit mode switching circuit select the first optical connector or the second optical connector and make the transmission mode switching circuit output an electric signal to the first optical connector or to the second optical connector.

Therefore, the master unit transmit/receive mode switching circuit and the slave unit transmit mode switching circuit are automatically controlled to allow an optical signal to be automatically transmitted.

In an embodiment, the optical connector converts an optical signal from the optical fiber into an electric signal by means of a light receiving element, and converts an electric signal from the transmission mode switching circuit into an optical signal by means of a light emitting element to output the optical signal to the optical fiber.

Furthermore, the present invention provides an optical fiber transmission system in which optical signal transmitter-receiver units connected respectively to a main controller, input ports, and output ports are serially connected by way of optical fibers for data communication between the main controller and any one of the input ports or the output ports through optical transmission, wherein:

(a) a main controller optical signal transmitter-receiver unit connected to the main controller comprises:

a first optical connector for converting a serial optical signal transmitted by way of the optical fiber into a serial electric signal, and converting a serial electric signal transmitted from the main controller into a serial optical signal to transmit the optical signal to the optical fiber; and a main controller optical signal control circuit for taking in input data included in the serial electric signal obtained through conversion in the first optical connector to transmit the input data to the main controller, and transmitting the serial electric signal from the main controller to the first optical connector, (b) the output port optical signal transmitter-receiver units connected to the output ports each comprise:

a second optical connector for converting a serial optical signal transmitted from the main controller by way of the optical fiber into a serial electric signal, and converting a serial electric signal inputted thereto into a serial optical signal to transmit the optical signal to the main controller by way of the optical fiber;

a third optical connector for converting a serial optical signal transmitted from a subordinate optical signal transmitter-receiver unit by way of the optical fiber into a serial electric signal to transmit the electric signal to the second optical connector, and converting a serial electric signal inputted from the second optical connector into a serial optical signal to transmit the optical signal to a subordinate optical signal transceiver-receiver unit by way of the optical fiber; and an output port optical signal control circuit for transmitting output data included in the serial electric signal obtained through conversion in the second optical connector to the associated output port connected to the output port optical signal transmitter-receiver unit when address data included in the serial electric signal coincides with its own address data, and (c) the input port optical signal transmitter-receiver units connected to the input ports each comprise:

a fourth optical connector for converting a serial optical signal transmitted from the main controller by way of the optical fiber into a serial electric signal, and converting a serial electric signal inputted thereto into a serial optical signal to transmit the optical signal to the main controller by way of the optical fiber;

a fifth optical connector for converting a serial optical signal transmitted from a subordinate optical signal transceiver-receiver unit by way of the optical fiber into a serial electric signal, and converting a serial electric signal inputted from the fourth optical connector into a serial optical signal to transmit the optical signal to the subordinate optical signal transceiver-receiver unit by way of the optical fiber; and an input port optical signal control circuit for taking in input data from the input port connected thereto and converting the input data into a serial electric signal to transmit the electric signal to the fourth optical connector when address data included in the serial electric signal obtained through conversion in the fourth optical connector coincides with its own address data, and transmitting a serial electric signal transmitted from the fifth optical connector to the fourth optical connector when the address data do not coincide with each other.

This system operates as follows when transmitting the output data from the main controller to the output port having the designated address.

When the serial electric signal including the output data and the address data is transmitted to the main controller optical signal transmitter-receiver unit by the main controller, the serial electric signal is transmitted to the first optical connector. Then the electric signal is converted into a serial optical signal by the first optical connector and transmitted to the output port optical signal transmitter-receiver unit by way of the optical fiber.

Then, at the output port optical signal transmitter-receiver unit which has received the serial optical signal from the main controller, the serial optical signal is converted into a serial electric signal by the second optical connector. When the address data included in the converted serial electric signal coincides with its own address, the output data included in the serial electric signal is transmitted by the output port optical signal control circuit to the output port connected to the output port optical signal control circuit.

Conversely, when the address data does not coincide with its own address, the serial electric signal obtained through conversion is transmitted to the third optical connector. Then, the electric signal is converted into a serial optical signal by the third optical connector and transmitted to the subordinate optical signal transceiver-receiver section by way of the optical fiber.

Furthermore, the system operates as follows when receiving the input data from the input port having the designated address.

First, when a serial electric signal including the control signal and the address data is transmitted from the main controller to the main controller optical signal control section, the electric signal is converted into a serial optical signal and transmitted to the input port optical signal transmitter-receiver unit by the main controller optical signal control section in a manner similar to that of the aforementioned output data.

Then, at the input port optical signal transmitter-receiver unit which has received the serial optical signal from the main controller, the serial optical signal is converted into a serial electric signal by the fourth optical connector. When the address data included in the serial electric signal obtained through conversion coincides with its own address, the input data is taken in by the input port optical signal optical signal control circuit from the input port connected to the input port optical signal control circuit and then converted into a serial electric signal to be transmitted to the fourth optical connector. Conversely, when both the address data do not coincide with each other, the serial electric signal formed by converting the serial optical signal from the subordinate optical signal transceiver-receiver section by means of the fifth optical connector is transmitted to the fourth optical connector.

Thus the serial electric signal including the input data from the input port transmitted to the fourth optical connector or the serial electric signal from the subordinate optical signal transceiver-receiver section is converted into a serial optical signal by the fourth optical connector and transmitted to the main controller by way of the optical fiber.

Then the optical signal is converted into a serial electric signal by the first optical connector of the main controller optical signal transmitter-receiver unit, and the input data included in the serial electric signal is taken in by the main controller optical signal transmitter-receiver unit and transmitted to the main controller.

With the above-mentioned arrangement, the main controller requires no specific optical appliance for specifying the I/O port of the other party with which the main controller transmits data.

Therefore, according to the present invention, a simple optical transmission structure can be achieved at low costs.

In this system, because the optical signal transceiver-receiver sections are connected with each other by way of only the optical fiber and the optical connectors, and therefore a connection having a high optical coupling efficiency can be obtained.

Furthermore, the main controller can designate in a simple manner the destination output port or input port that the main controller desires to communicate data with only by rewriting the address data included in the serial signal to be transmitted into the address data of the destination output port or the destination input port. Therefore, an optical fiber transmission system which is easy to use is provided.

In an embodiment, the main controller optical signal control circuit comprises a first shift register for converting the serial electric signal transmitted from the first optical connector into a parallel electric signal; and a first latch circuit for latching input data included in the parallel electric signal. And, each output port optical signal control circuit comprises a second shift register for converting the serial electric signal transmitted from the second optical connector into a parallel electric signal; a second latch circuit for latching address data included in the parallel electric signal; a first address comparing circuit for comparing the address data latched in the second latch circuit with address data of the output port optical signal transmitter-receiver unit, and outputting a first address coincidence signal when these address data coincide with each other; and a data latch circuit for latching output data included in the parallel electric signal upon receiving the first address coincidence signal. And, each input port optical signal control circuit comprises a third shift register for converting the serial electric signal transmitted from the fourth optical connector into a parallel electric signal; a third latch circuit for latching address data included in the parallel electric signal; a second address comparing circuit for comparing the address data latched in the third latch circuit with address data of the input port optical signal transmitter-receiver unit, and outputting a second address coincidence signal when these address data coincide with each other; a control signal latch circuit for, upon receiving the second address coincidence signal, latching a control signal included in the parallel electric signal and outputting a transmission line setting signal; a fourth shift register for converting input data transmitted from the input port into a serial electric signal and latching the electric signal; and a transmission line control circuit for switching a transmission line in a normal state in which the serial electric signal from the fifth optical connector is transmitted to the fourth optical connector to a transmission line for transmitting the serial electric signal from the fourth shift register to the fourth optical connector based on the transmission line setting signal transmitted from the control signal latch circuit.

In this system, in transmitting the output data from the main controller to the output port having the designated address, the output port optical signal control circuit operates in a manner as follows.

The serial electric signal from the second optical connector is converted into a parallel electric signal by the second shift register. Then the address data included in the parallel electric signal is latched in the second latch circuit. Then the address data latched in the second latch circuit is compared with its own address data by the first address comparing circuit. When both the address data coincide with each other, the first address coincidence signal is outputted. Then the output data included in the parallel electric signal is latched in the data latch circuit which has received the first address coincidence signal.

Thus the output data latched in the data latch circuit is transmitted to the output port connected to the output data optical signal control section.

With the above-mentioned arrangement, the output port optical signal transmitter-receiver unit can speedily discriminate whether the serial optical signal from the main controller is the serial optical signal directed to itself, thereby allowing the output data to be received without being provided with any CPU.

Further, in receiving the input data from the input port having the address designated by means of the main controller, the input port optical signal control circuit operates in a manner as follows.

A serial electric signal from the fourth optical connector is converted into a parallel electric signal by the third shift register. Then the address data included in the parallel electric signal is latched in the third latch circuit. Then the address data latched in the third latch circuit is compared with its own address data by the second address comparing circuit. When both the address data coincide with each other, the second address coincidence signal is outputted. Then the control signal included in the parallel electric signal is latched in the control signal latch circuit which has received the second address coincidence signal, and the transmission line setting signal is outputted.

Meanwhile, the input data from the input port has been converted into a serial electric signal and latched in the fourth shift register. Then, based on the transmission line setting signal from the control signal latch circuit, the transmission line in the normal state in which the serial electric signal from the fifth optical connector is transmitted to the fourth optical connector is switched to the transmission line for transmitting the serial electric signal from the fourth shift register to the fourth optical connector. Consequently, when both the address data coincide with each other, a serial electric signal including the input data from the input port is transmitted to the fourth optical connector. When they do not coincide with each other, the serial electric signal from the fifth optical connector is transmitted to the fourth optical connector.

Thus the serial electric signal transmitted to the fourth optical connector is converted into a serial optical signal, and then transmitted to the main controller by way of the optical fiber.

The serial optical signal transmitted from the fourth optical connector is transmitted through the output port optical signal transmitter-receiver unit or the input port optical signal transmitter-receiver unit interposed between the main controller optical signal transmitter-receiver unit and the input port optical signal main transmitter-receiver unit, and then reaches the controller optical signal transmitter-receiver unit.

Then the serial optical signal is converted into a serial electric signal by the first optical connector of the main controller optical signal transmitter-receiver unit and converted into a parallel electric signal by the first shift register. Then the input data included in the parallel electric signal is latched in the first latch circuit and transmitted to the main controller.

Thus the input data from the input port having the address designated by the main controller is received by the main controller.

As obvious, the input port optical signal transmitter-receiver unit can speedily discriminate whether the serial optical signal from the main controller is the serial optical signal directed to itself, thereby allowing the input data to be transmitted without use of a CPU.

The first through fifth optical connectors comprises a light receiving element for converting a serial optical signal inputted thereto into a serial electric signal; and a light emitting element for converting a serial electric signal into a serial optical signal.

Furthermore, the present invention provides an optical fiber transmission system comprising a master optical signal transmitter-receiver unit, a plurality of slave optical signal transmitter-receiver units, and optical fibers, said master and slave optical signal transmitter-receiver units being connected in series through said optical fibers, wherein:

(a) said master optical signal transmitter-receiver unit comprises:

an optical connector connected with the optical fiber and having an optical signal receiving means for receiving an optical signal from the optical fiber and converting the optical signal to an electric signal and an optical signal transmitting means for converting an electric signal to an optical signal and outputting the optical signal to the optical fiber, the signal from the master optical signal transmitter-receiver unit including address data of a designated slave optical signal transmitter-receiver unit for communication with the master optical signal transmitter-receiver unit; and mode switching means connected with the optical connector for switching an operation mode of the master optical signal transmitter-receiver unit between a receive mode wherein the optical connector receives the optical signal from the optical fiber and a send mode wherein the optical connector transmits the optical signal to the optical fiber, (b) said slave optical signal transmitter-receiver units each comprise:

a first optical connector connected with the optical fiber which connects the present slave optical signal transmitter-receiver unit with the master optical signal transmitter-receiver unit when the present slave optical signal transmitter-receiver unit is immediately next to the master optical signal transmitter-receiver unit or with the preceding slave optical signal transmitter-receiver unit closer to the master optical signal transmitter-receiver unit when the present slave optical signal transmitter-receiver unit is not immediately next to the master optical signal transmitter-receiver unit, and having an optical signal receiving means for receiving an optical signal from the optical fiber and converting the optical signal to an electric signal and an optical signal transmitting means for converting an electric signal to an optical signal and outputting the optical signal to the optical fiber;

a second optical connector connected with the first optical connector and the optical fiber which connects the present slave optical signal transmitter-receiver unit with the following slave optical signal transmitter-receiver unit farther from the master optical signal transmitter-receiver unit, and having an optical signal receiving means for receiving an optical signal from the optical fiber and converting the optical signal to an electric signal and an optical signal transmitting means for converting an electric signal to an optical signal and outputting the optical signal to the optical fiber;

mode switching means connected with the first and second optical connectors for switching an operation mode of the slave optical signal transmitter-receiver unit between a first mode wherein the optical signal received by the first optical connector is transferred to the second optical connecter after conversion to the electric signal and then outputted to the associated optical fiber from the second optical connector after conversion to the optical signal and a second mode wherein the optical signal received by the second optical connector is transferred to the first optical connecter after conversion to the electric signal and then outputted to the associated optical fiber from the first optical connector after conversion to the optical signal; and address comparing means for comparing the address data transmitted from the master optical signal transmitter-receiver unit with address data of the present slave optical signal transmitter-receiver unit to decide whether the present slave optical signal transmitter-receiver unit is the designated slave optical signal transmitter-receiver unit, whereby the present slave optical signal transmitter-receiver unit outputs data of itself toward the master optical signal transmitter-receiver unit or takes in data from the master optical signal transmitter-receiver unit only when the address data coincide with each other.

In summary, any aspect of the present invention provides an inexpensive optical fiber transmission system which has a simple optical transmission structure and a high optical coupling efficiency, thereby allowing the system to be easily used.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 11, 12A and 12B are flowcharts of a polling operation performed by the optical fiber transmission system of the first embodiment, wherein FIG. 11 shows a flow of an operation performed by the master unit side, and FIGS. 12A and 12B each show a flow of an operation performed by the slave unit side (for slave unit 1 and slave unit n);

FIGS. 13, 14A and 14B are flowcharts of a selecting operation performed by the optical fiber transmission system of the first embodiment, wherein FIG. 13 shows a flow of an operation performed by the master unit side, and FIGS. 14A and 14B each show a flow of an operation performed by the slave unit side (for slave unit 1 and slave unit n);

FIG. 22 is a diagram showing the structure of a serial signal including input data or output data;

FIG. 23 is a diagram showing the structure of a transmission request signal;

FIGS. 24A and 24B show examples of address data and synchronization signal included in a serial signal used in the optical fiber transmission system of FIG. 18;

DETAILED DESCRIPTION OF THE PREFERRED EMBODIMENTS

The present invention will be described in detail below based on preferred embodiments with reference to the accompanying drawings.

First Embodiment

Figure 1:
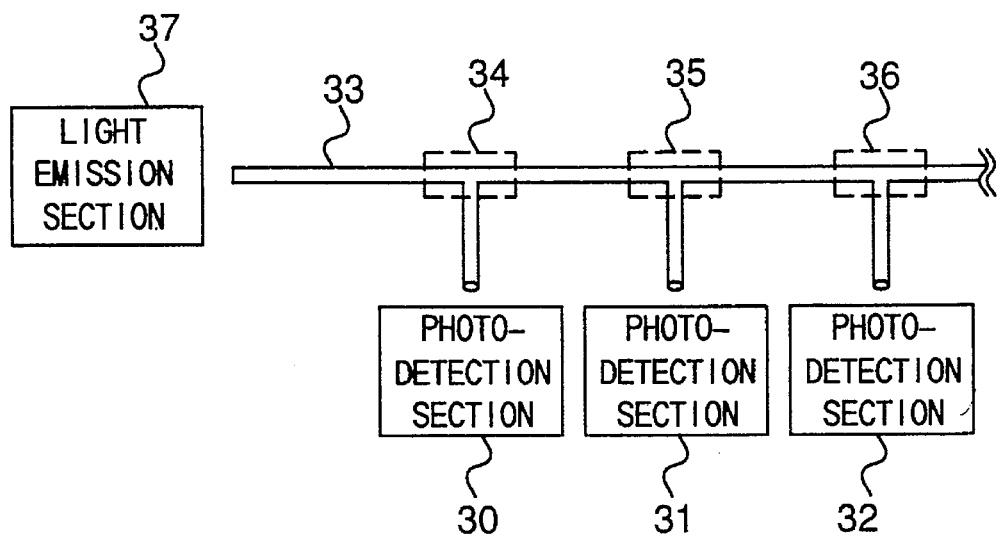
FIG. 1 is a diagram showing the structure of Conventional Example 1.
Figure 2:
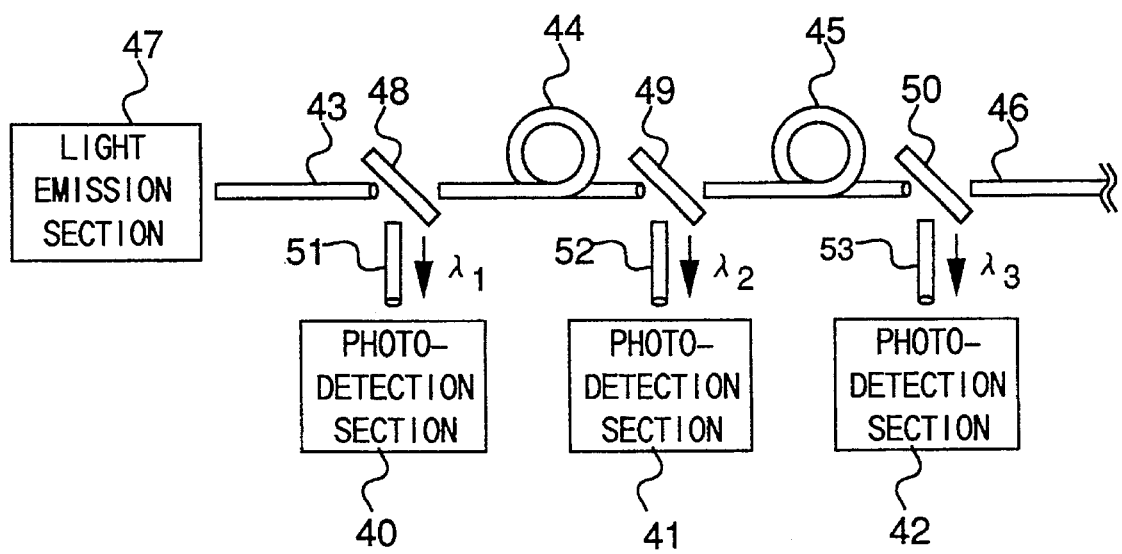
FIG. 2 is a diagram showing the structure of Conventional Example 2.
Figure 3:
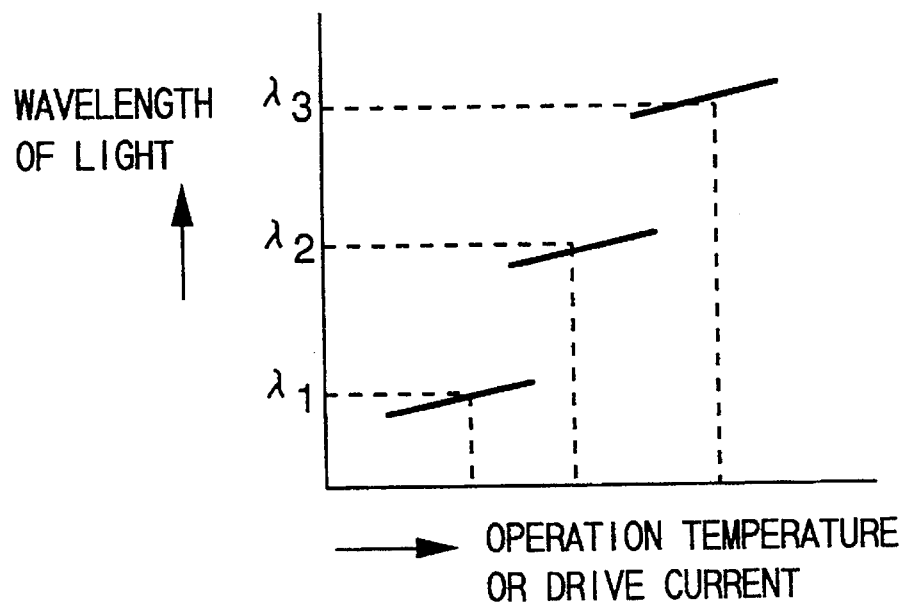
FIG. 3 is a graph showing emission characteristics of the photodetection section of Conventional Example 2.
Figure 4:
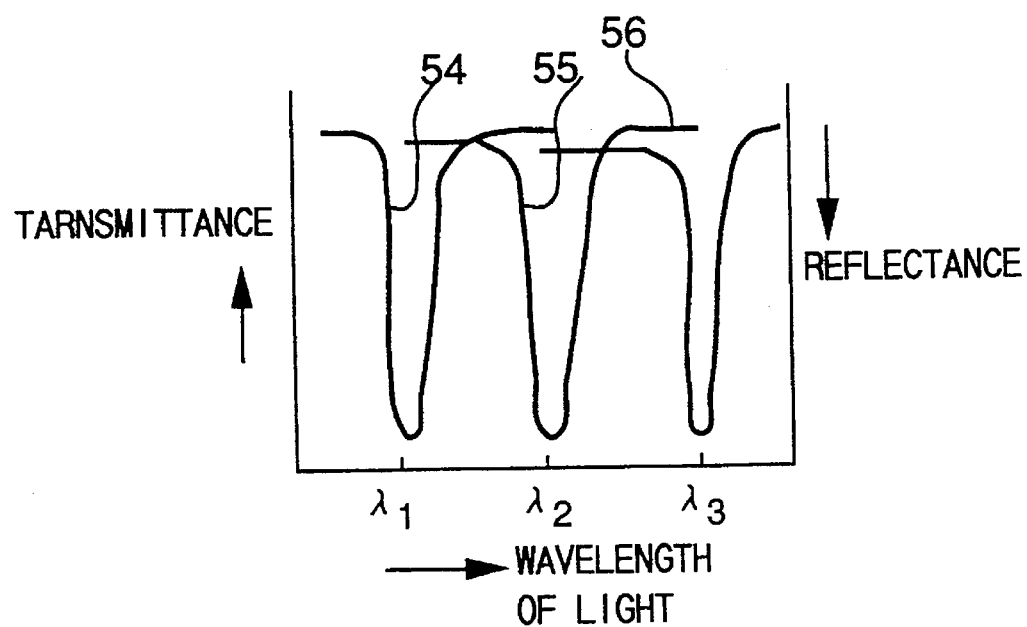
FIG. 4 is a graph showing characteristics of the optical filter of Conventional Example 2.
Figure 5:
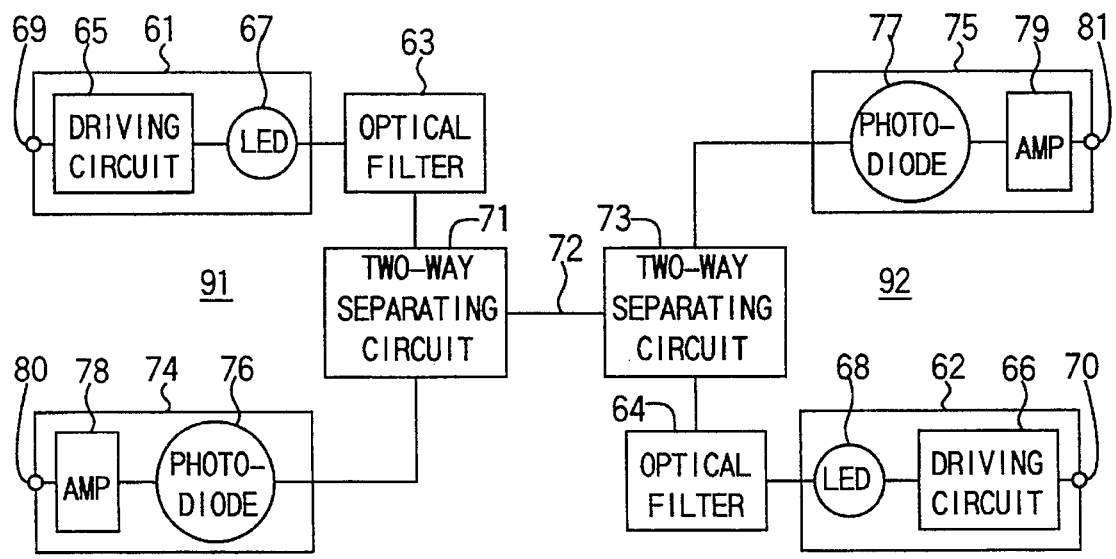
FIG. 5 is a diagram showing the structure of Conventional Example 3.
Figure 6:
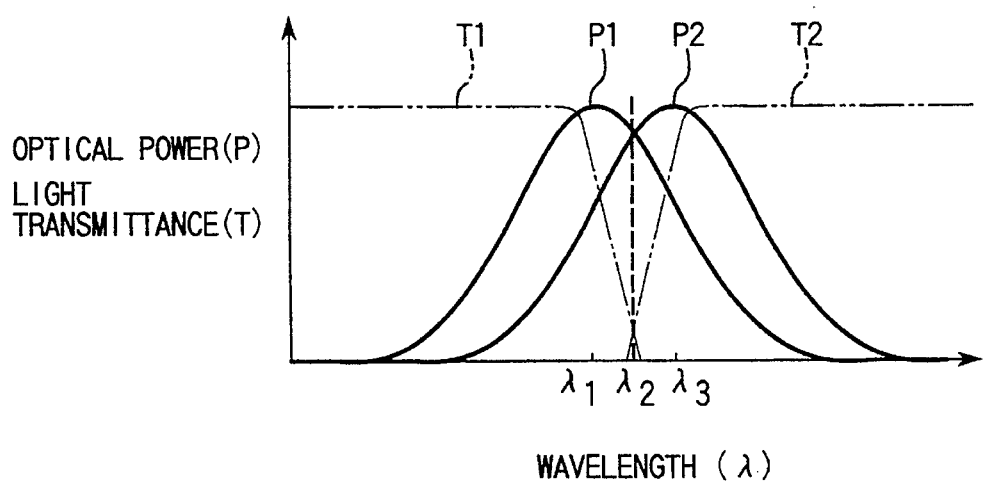
FIG. 6 is a graph showing emission spectrum characteristics and light transmittance characteristics of Conventional Example 3.
Figure 7:
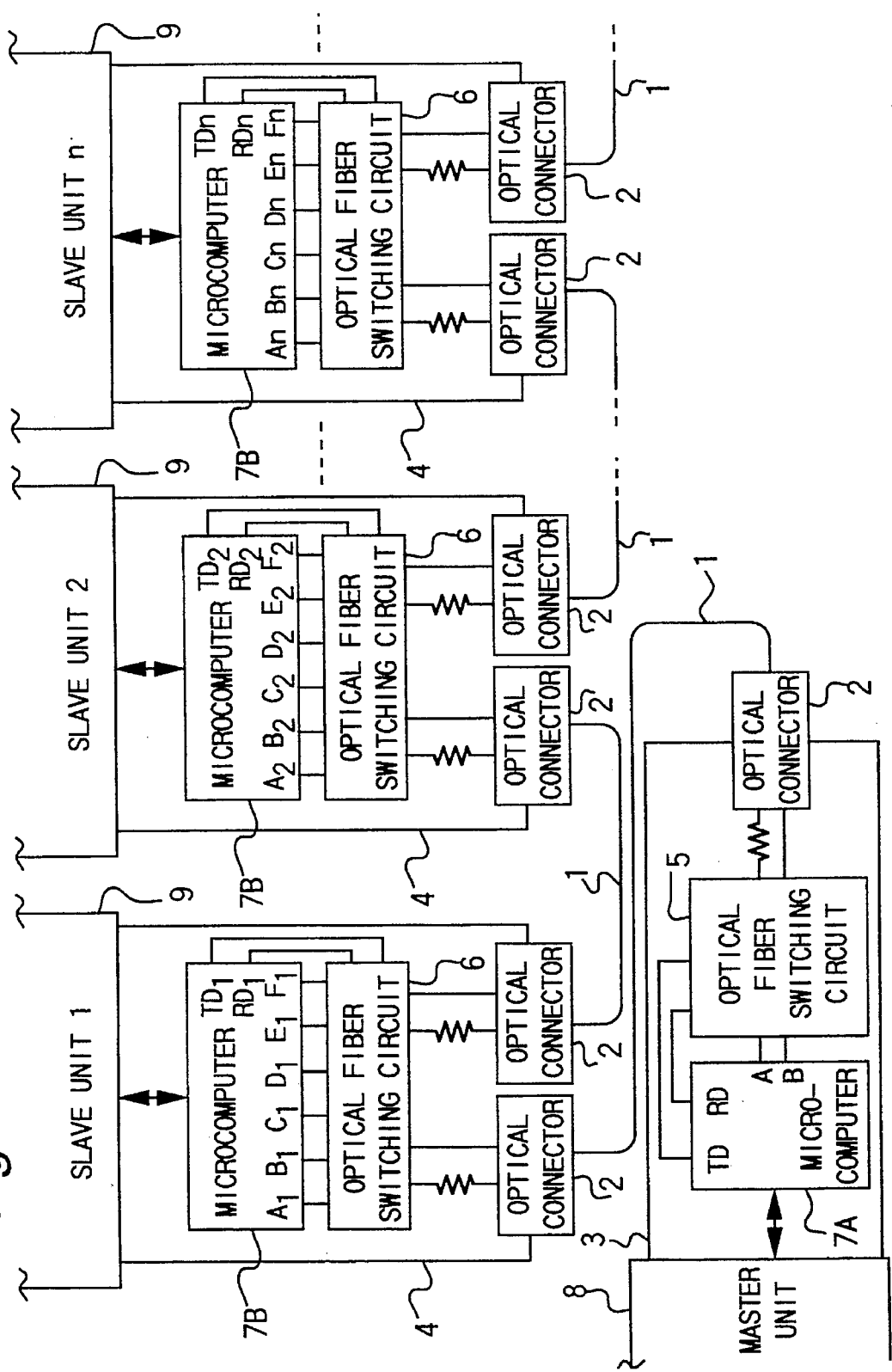
FIG. 7 is a block diagram of an optical fiber transmission system according to a first embodiment of the present invention.

FIG. 7 shows an optical fiber transmission system according to a first embodiment of the present invention. The present embodiment has a master optical signal transmitter-receiver unit 3 provided in a master unit 8, slave optical signal transmitter-receiver units 4, 4, 4, . . . provided in a plurality of slave units 9, and optical fibers 1.

The main unit 8 is a main computer and each slave unit 9 is a subcomputer or a peripheral of the main computer 8. The master optical signal transmitter-receiver unit 3 is connected to the main computer 8, while the slave optical signal transmitter-receiver units 4 are connected to the subcomputers or peripherals 9. The master optical signal transmitter-receiver unit 3 and the slave optical signal transmitter-receiver units 4, 4, 4, . . . are connected in series by way of the optical fibers 1.

The master optical signal transmitter-receiver unit 3 has a microcomputer 7A, an optical fiber switching circuit 5, and an optical connector 2. On the other hand, each of the slave optical signal transmitter-receiver units 4 has a microcomputer 7B, an optical fiber switching circuit 6, and two optical connectors 2.

As obvious from the description below, the optical fiber switching circuits 5 and 6 each switch the optical signal transmission direction by switching the operation mode of the respective optical signal transmitter-receiver units 3 and 4 between the "transmit" mode and the "receive" mode.

Figure 8:
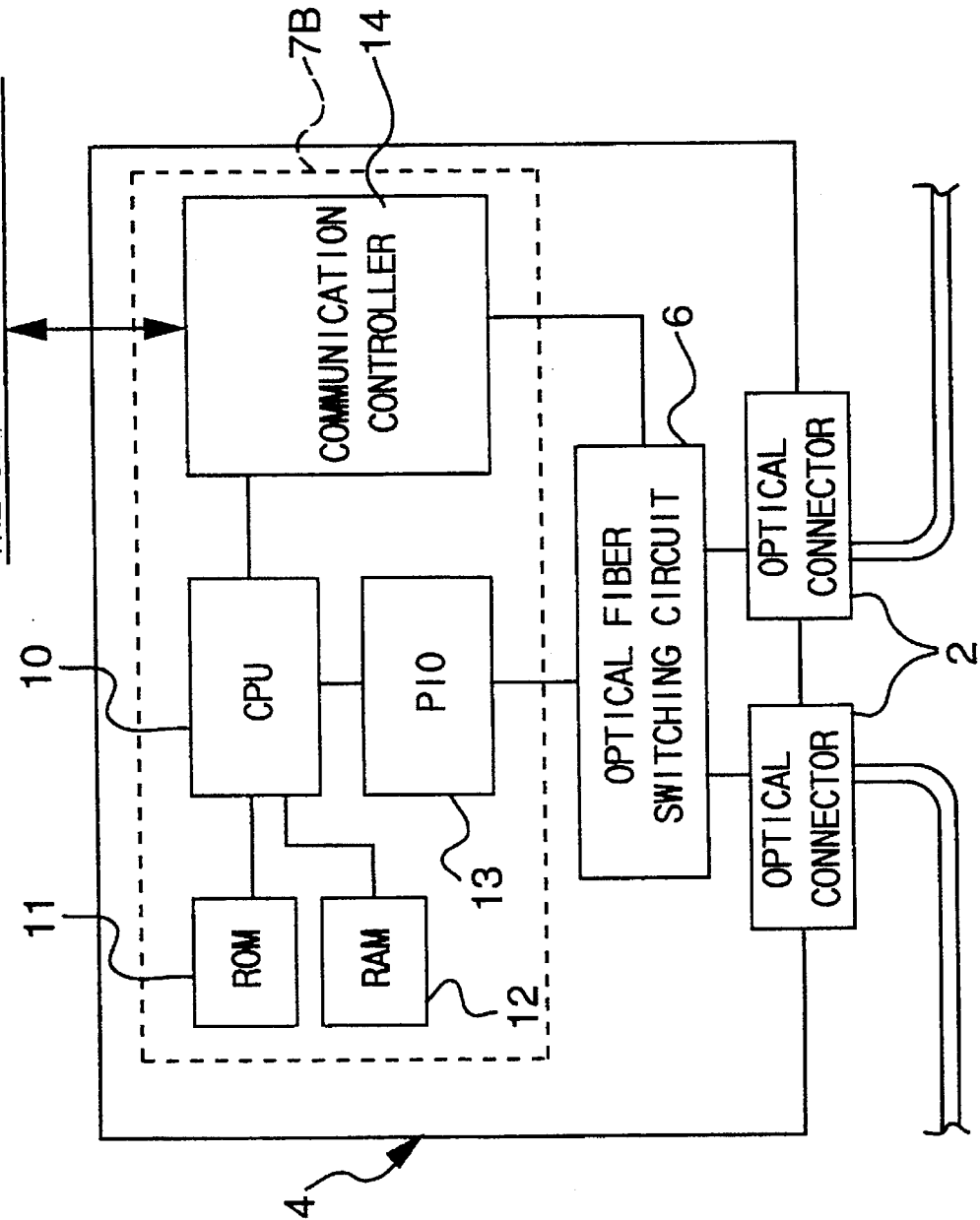
FIG. 8 is a block diagram of an optical signal transmitter-receiver unit for a slave unit in the first embodiment.

As shown in FIG. 8, the microcomputer 7B of each of the slave optical signal transmitter-receiver units 4 is a one-chip microcomputer having a ROM (read only memory) 11, a RAM (random access memory) 12, a CPU (central processing unit) 10, a PIO (parallel input/output interface) 13, and a communication controller 14. The PIO 13 controls the optical fiber switching circuit 6 and the communication controller 14 controls the optical signal communication by way of the optical fibers as well as the communication with the slave unit main part.

Figure 9:
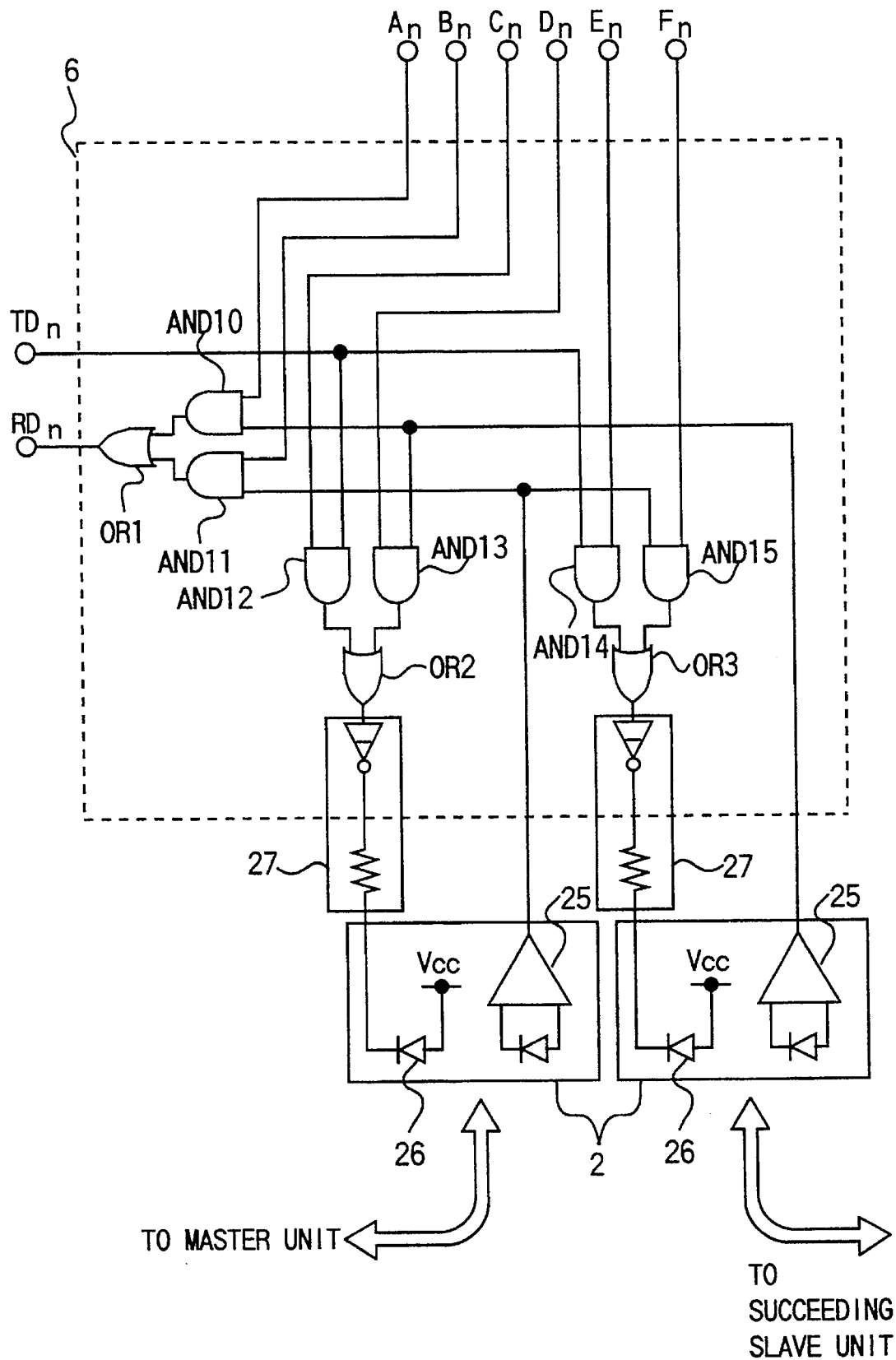
FIG. 9 is a circuit diagram of an optical fiber switching circuit and an optical connector in the optical signal transmitter-receiver unit for the slave unit.

As shown in FIG. 9, the optical fiber switching circuit 6 includes control input terminals An, Bn, Cn, Dn, En, and Fn, an optical signal transmission terminal TDn, and an optical signal reception terminal RDn. The control input terminals An through Fn are connected to the PIO 13 in the microcomputer 7B, as shown in FIG. 7. The optical signal transmission terminal TDn is connected to a data output terminal of the communication controller 14 in the microcomputer 7B, while the optical signal receiving terminal RDn is connected to a data input terminal of the communication controller 14.

Figure 10:
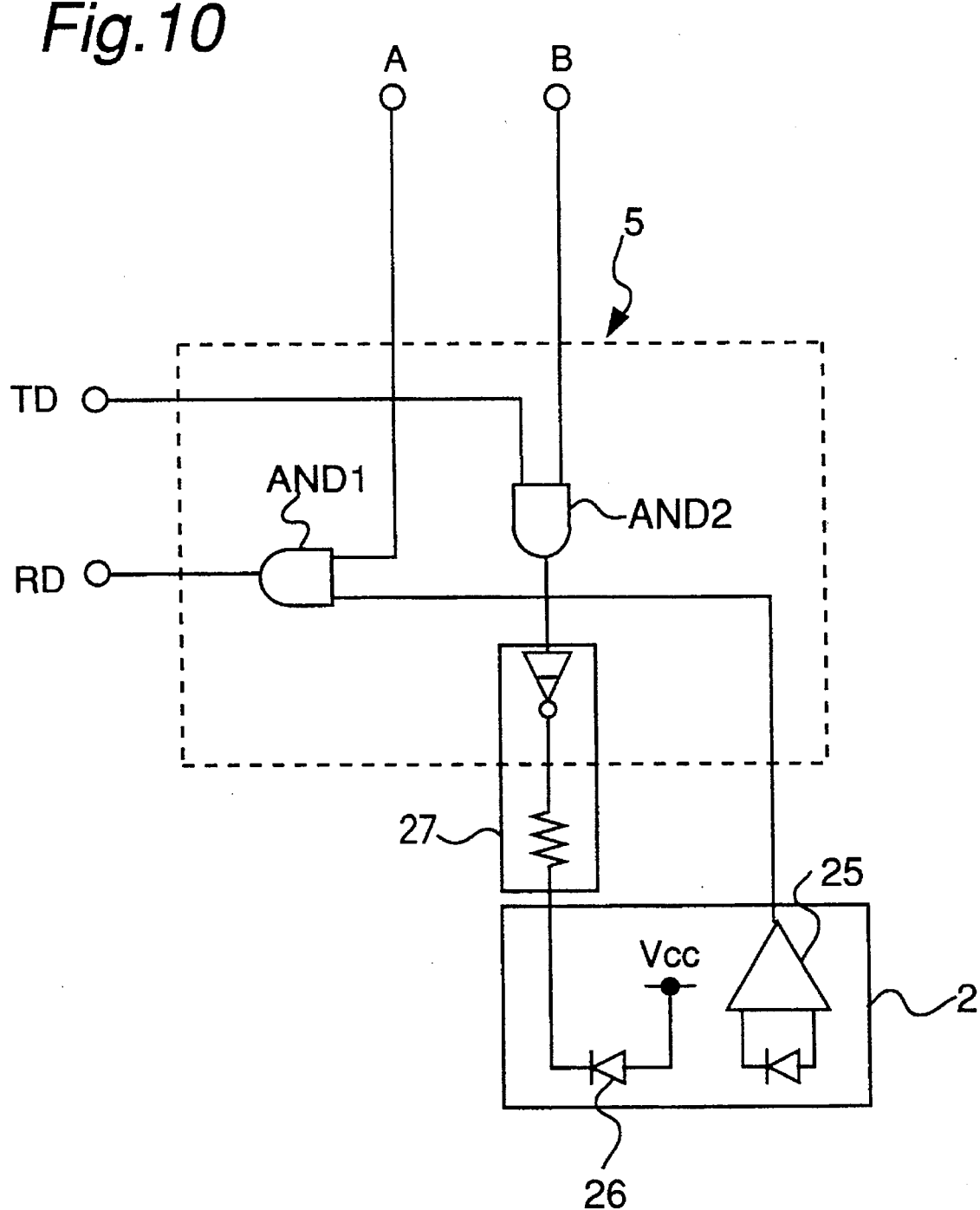
FIG. 10 is a circuit diagram of an optical fiber switching circuit and an optical connector of a optical signal transmitter-receiver unit for a master unit in the first embodiment.

FIG. 10 shows the optical fiber switching circuit 5 of the master optical signal transmitter-receiver unit 3. Terminals A and B are connected to terminals A and B of the microcomputer 7A, while terminals TD and RD are connected to terminals TD and RD of the microcomputer 7A, as shown in FIG. 7.

Figure 15:
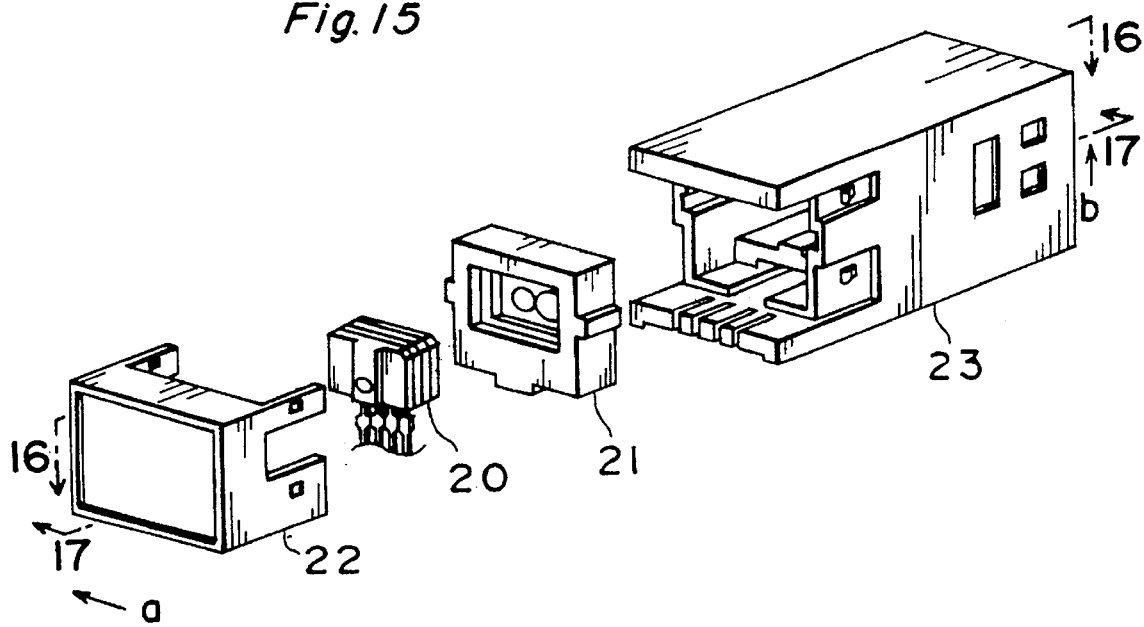
FIG. 15 is an exploded perspective view of the optical connector in the first embodiment system.
Figure 16:
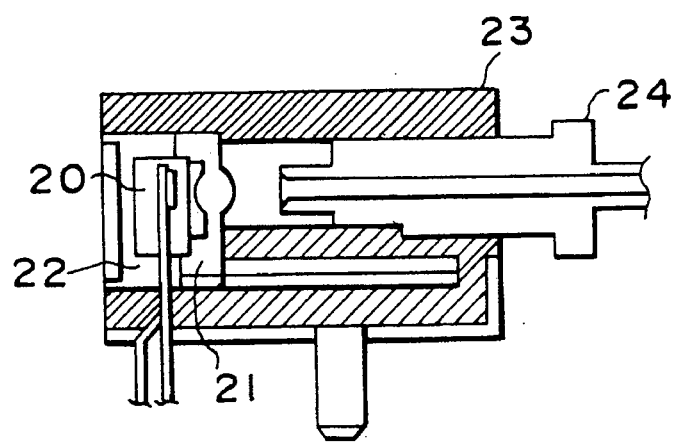
FIG. 16 is a sectional view taken along a line 16—16 and viewed in the direction a of FIG. 15.
Figure 17:
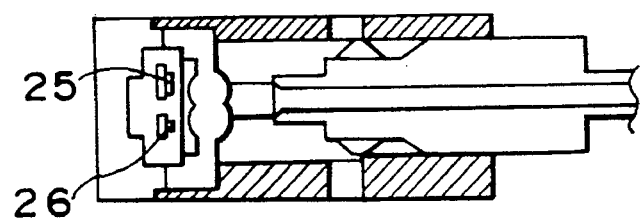
FIG. 17 is a sectional view taken along a line 17—17 and viewed in the direction b of FIG. 15.

FIGS. 15, 16, and 17 show the structure of the optical connector 2 of the present preferred embodiment. As shown in FIG. 15, the optical connector 2 has a holder 23, a lens 21 to be fit in the holder 23, an electronic device 20, and a rear lid 22. The optical connector 2 has its electric circuits built in the device 20. The device 20 has therein a receiving photoelectric converting section 25 and a sending photoelectric converter section 26. The receiving photoelectric converter section 25 has, for example, a photodiode, while the sending photoelectric converter section 26 has, for example, a light emitting diode. As shown in FIG. 16, a connector 24 is fit in the holder 3 and the optical fiber cable 1 is inserted in the connector 24. The lens 21 optimizes the optical coupling between the optical fiber cable 1 and the photoelectric converter sections 25 and 26 inside the device 20. The device 20 is placed and fixed in the holder 23, interposed between the lens 21 and the rear lid 22.

In FIGS. 9 and 10, reference numeral 27 indicates a drive circuit for the sending photoelectric converter section 26.

A polling operation of the optical fiber transmission system of the present preferred embodiment will be described below. The polling is an operation of designating a slave unit (hence a slave optical signal transmitter-receiver unit) that the master unit (hence the master optical signal transmitter-receiver unit) desires to communicate with and transmitting data from the designated salve unit (the designated slave optical signal transmitter-receiver unit) to the master unit (the master optical signal transmitter-receiver unit). An outline of a communication procedure in the polling operation will be described first, and thereafter the polling operation of the present embodiment will be described in more detail with reference to the drawings.

First, the master optical signal transmitter-receiver unit transmits address data of a slave optical signal transmitter-receiver unit that the master optical signal transmitter-receiver unit desires to communicate with, and waits for a response from the slave optical signal transmitter-receiver unit. All the slave optical signal transmitter-receiver units receive the address data sent from the master optical signal transmitter-receiver unit. Then, only the slave optical signal transmitter-receiver unit having an address corresponding to the transmitted address data sends back the address data to the master optical signal transmitter-receiver unit, and waits for a command from the master optical signal transmitter-receiver unit. In the polling operation, the master optical signal transmitter-receiver unit transmits a data request signal, and waits for data from the desired slave optical signal transmitter-receiver unit. Upon receiving the data request signal from the master optical signal transmitter-receiver unit, the designated slave optical signal transmitter-receiver unit transmits data to the master optical signal transmitter-receiver unit. When the data transmission is completed, the slave optical signal transmitter-receiver unit transmits a communication completion signal. Upon receiving the communication completion signal, the master optical signal transmitter-receiver unit completes the communication, and returns to the initial state.

In the initial state of the present embodiment system, the microcomputer 7A of the master unit optical signal transmitter-receiver unit 3 turns its control terminal A to an H level, and turns its control terminal B to an L level. Consequently, an H-level signal is outputted to an AND circuit AND1 of the optical fiber switching circuit 5, while an L-level signal is outputted to an AND circuit AND2. As a result, the optical fiber switching circuit 5 puts the master unit optical signal transmitter-receiver unit 3 into the receive mode.

On the other hand, the microcomputer 7B of the slave unit optical signal transmitter-receivers 4 for slave units m (m =1, 2, ..., n, ...) turn their control terminals Bm and Fm to an H level, and turn the other terminals to an L level in the initial state. Then an H-level signal is inputted to an AND circuit AND11 and to an AND circuit AND15 of the optical fiber switching circuit 6. Meanwhile, an L-level signal is inputted to the other AND circuits AND10, 12, 13, and 14. As a result, the optical signal transmitter-receiver units 4 of the slave units m are ready for receiving the transmission data from the optical signal transmitter-receiver unit 3 of the master unit 8 and also forwarding the data received from the optical signal transmitter-receiver unit 3 of the master unit 8 to the optical signal transmittal-receivers 4 of the inferior slave units (slave unit m+1, slave unit m+2, ...) succeeding the slave unit m. With the above-mentioned operation, all the slave units 1, 2, ..., n, ... connected to the master unit 8 can receive the data transmitted from the master unit 8.

Figure 11:
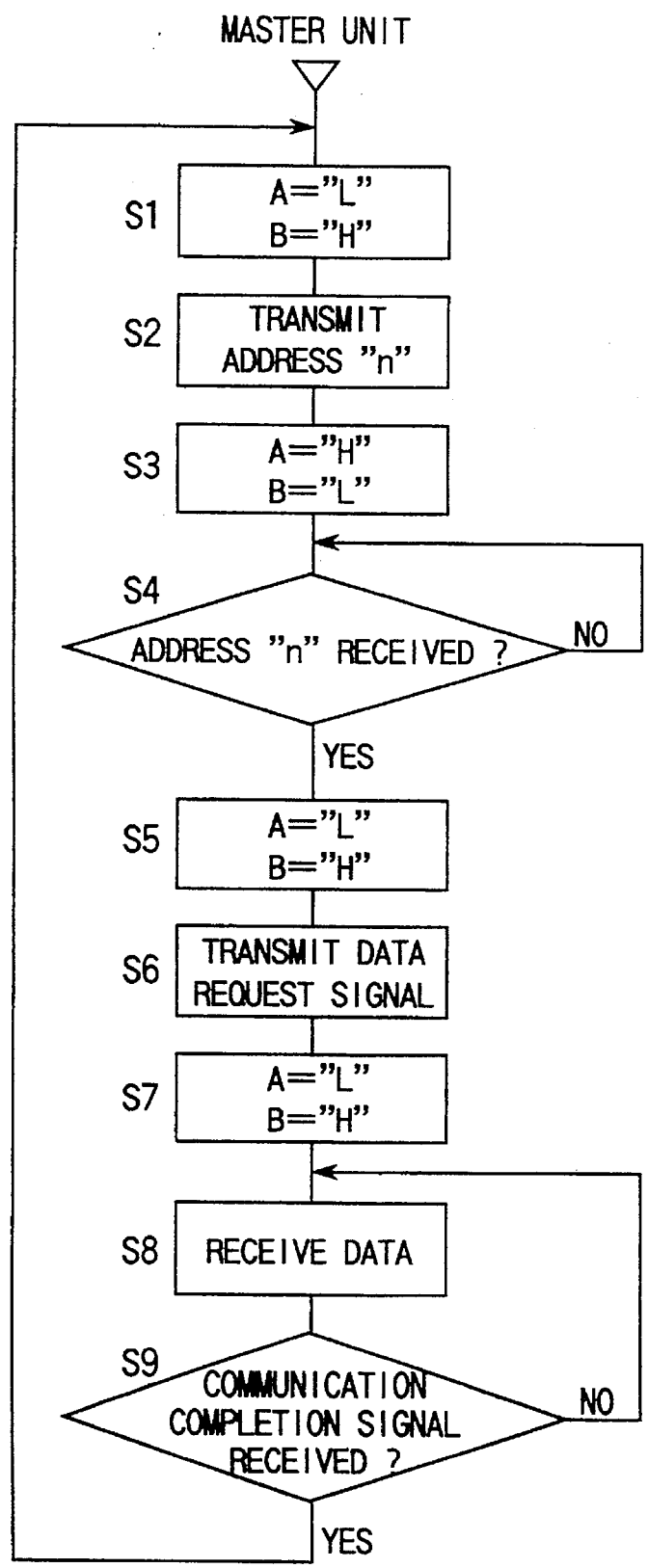

Then operations of the optical fiber switching circuits 5 and 6 for the polling of the optical fiber transmission system will be described in accordance with flowcharts shown in FIGS. 11 and 12B.

First of all, the microcomputer 7A of the master optical signal transmitter-receiver unit 3 provided in the master unit 8 makes the terminal A have an L level, and makes the terminal B have an H level (step S1) such that the optical fiber switching circuit 5 gets ready for sending. Thereby, data is allowed to be transmitted from the master unit 8. Then the optical signal transmitter-receiver unit 3 of the master unit 8 outputs address data of the optical signal transmitter-receiver unit 4 of a slave unit n to the optical fiber cable 1 via the optical fiber switching circuit 5 and the optical connector 2 (step S2). Then, the microcomputer 7A makes the terminal A have the H level and makes the terminal B have the L level (step S3) to put the optical fiber switching circuit 5 in the receive mode, and waits for a response from the optical signal transmitter-receiver unit 4 of the slave unit n.

On the side of the optical signal transmitter-receiver unit 4 of the slave unit n, upon confirming that the address data received from the optical signal transmitter-receiver unit 3 of the master unit 8 in its initial state (receiving state) of step S201 coincides with its own address (step S202), the microcomputer 7B turns the terminal Cn to the H level, and turns the other terminals to L level (step S203). With the above-mentioned operation, the optical signal transmitter-receiver unit 4 of the slave unit n gets ready to transmit data to the optical signal transmitter-receiver unit 3 of the master unit 8, and sends back the address data thereto (step S204). Then, the microcomputer 7B turns the terminal Bn to the H level, and turns the other terminals to the L level (step S205), whereby the optical signal transmitter-receiver unit 4 of the slave unit n gets ready to receive command data from the optical signal transmitter-receiver unit 3 of the master unit 8.

On the side of the optical signal transmitter-receiver unit 4 of the slave unit n, upon confirming in step S202 that the address data transmitted from the optical signal transmitter-receiver unit 3 of the master unit 8 does not coincide with its own address, the microcomputer 7B turns the terminals An and Dn to the H level, and turns the other terminals to L level (step S211). The optical signal transmitter-receiver unit 4 of the slave unit n is thereby made ready to transmit address data received from the optical signal transmitter-receiver unit 4 of the inferior or succeeding slave units (slave units n+1, n+2, ... ) toward the optical signal transmitter-receiver unit 3 of the master unit 8 via the optical fiber switching circuit 6 and the optical connector 2. Then, upon confirming that the address data received from the succeeding slave units has been sent to the optical signal transmitter-receiver unit 3 of the master unit 8 via the optical fiber switching circuit 6 and the optical connector 2 (step S212), the microcomputer 7B makes the terminal Bn and Fn have the H level, and makes the other terminals have the L level (step S213). As a result, the optical signal transmitter-receiver unit 4 of the slave unit n gets ready for forwarding the command from the optical signal transmitter-receiver unit 3 of the master unit 8 to the optical signal transmitter-receiver unit 4 of the succeeding slave units (slave units n+1, n+2, ... ).

On the side of the optical signal transmitter-receiver unit 3 of the master unit 8, upon confirming a response from the optical signal transmitter-receiver unit 4 of the slave unit n (step S4), the microcomputer 7A turns the terminal A to the L level, and turns the terminal B to the H level (step S5). Then the optical signal transmitter-receiver unit 3 of the master unit 8 outputs a data request signal to the optical fiber cable 1 via the optical fiber switching circuit 5 and the optical connector 2 (step S6). Thereafter the microcomputer 7A turns the terminal A to the H level, turns the terminal B to the L level (step S7), and waits for data from the optical signal transmitter-receiver unit 4 of the slave unit n.

On the side of the optical signal transmitter-receiver unit 4 of the slave unit n, upon confirming the data request signal from the optical signal transmitter-receiver unit 3 of the master unit 8 (step S206), the microcomputer 7B turns the terminal Cn to the H level, and turns the other terminals to the L level (step S207). Then, the optical signal transmitter-receiver unit 4 of the slave unit n transmits data to the optical signal transmitter-receiver unit 3 of the master unit 8 via the optical fiber switching circuit 6 and the optical connector 2 (step S208). Subsequently, when the data transmission is completed (step S209), the optical signal transmitter-receiver unit 4 of the slave unit n outputs the communication completion signal to the optical fiber cable 1 via the microcomputer 7B, the optical fiber switching circuit 6, and the optical connector 2 (step S210), and returns to the initial state.

Meanwhile, in the optical signal transmitter-receiver unit. 4 of a slave unit n of which the address does not coincide with the address data from the optical signal transmitter-receiver unit 3 of the master unit 8 and which is now ready to transfer instructions from the optical signal transmitter-receiver unit 3 of the master unit 8 to the optical signal transmitter-receiver unit 4 of the succeeding slave unit in step S213, upon confirming the data request signal from the optical signal transmitter-receiver unit 3 of the master unit 8 in step S214, the microcomputer 7B turns the terminals An and Dn to the H level, and turns the other terminals to the L level (step S215). Thus, the optical signal transmitter-receiver unit 4 of the slave unit n gets ready to forward data from the optical signal transmitter-receiver unit 4 of the succeeding inferior slave unit toward the optical signal transmitter-receiver unit 3 of the master unit 8. Upon completing the transmission of the data received from the optical signal transmitter-receiver unit 4 of the succeeding slave unit to the optical signal transmitter-receiver unit 3 of the master unit 8 (step S216), the optical signal transmitter-receiver unit 4 of the slave unit n returns to the initial state. Then, upon receiving the data sent from the succeeding slave unit n+1 via the optical signal transmitter-receiver unit 4 of the slave unit n (step S8) and receiving the communication completion signal (step S9), the optical signal transmitter-receiver unit 3 of the master unit 8 returns to the initial state and completes the polling operation.

Figure 12A:
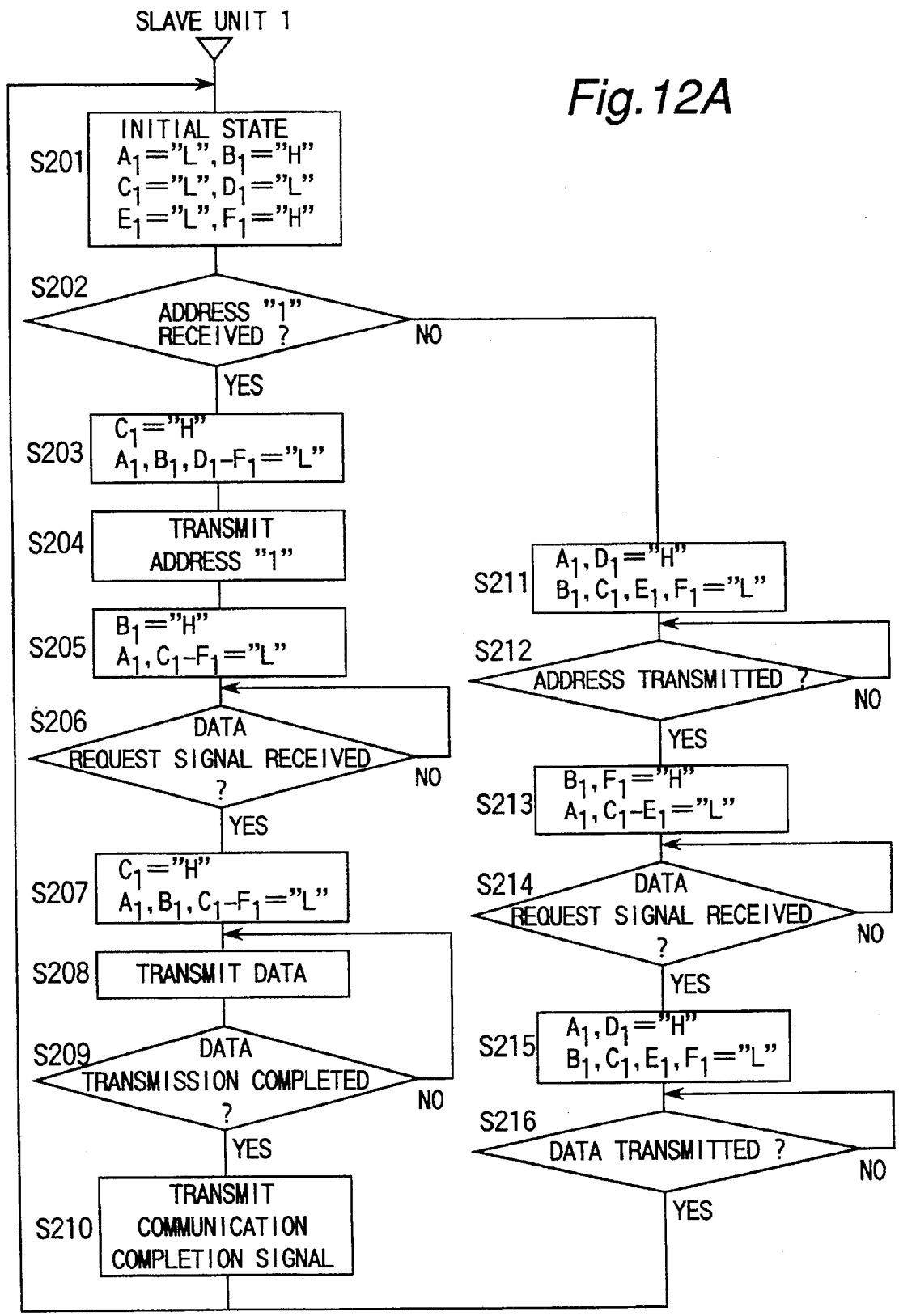
Figure 12B:
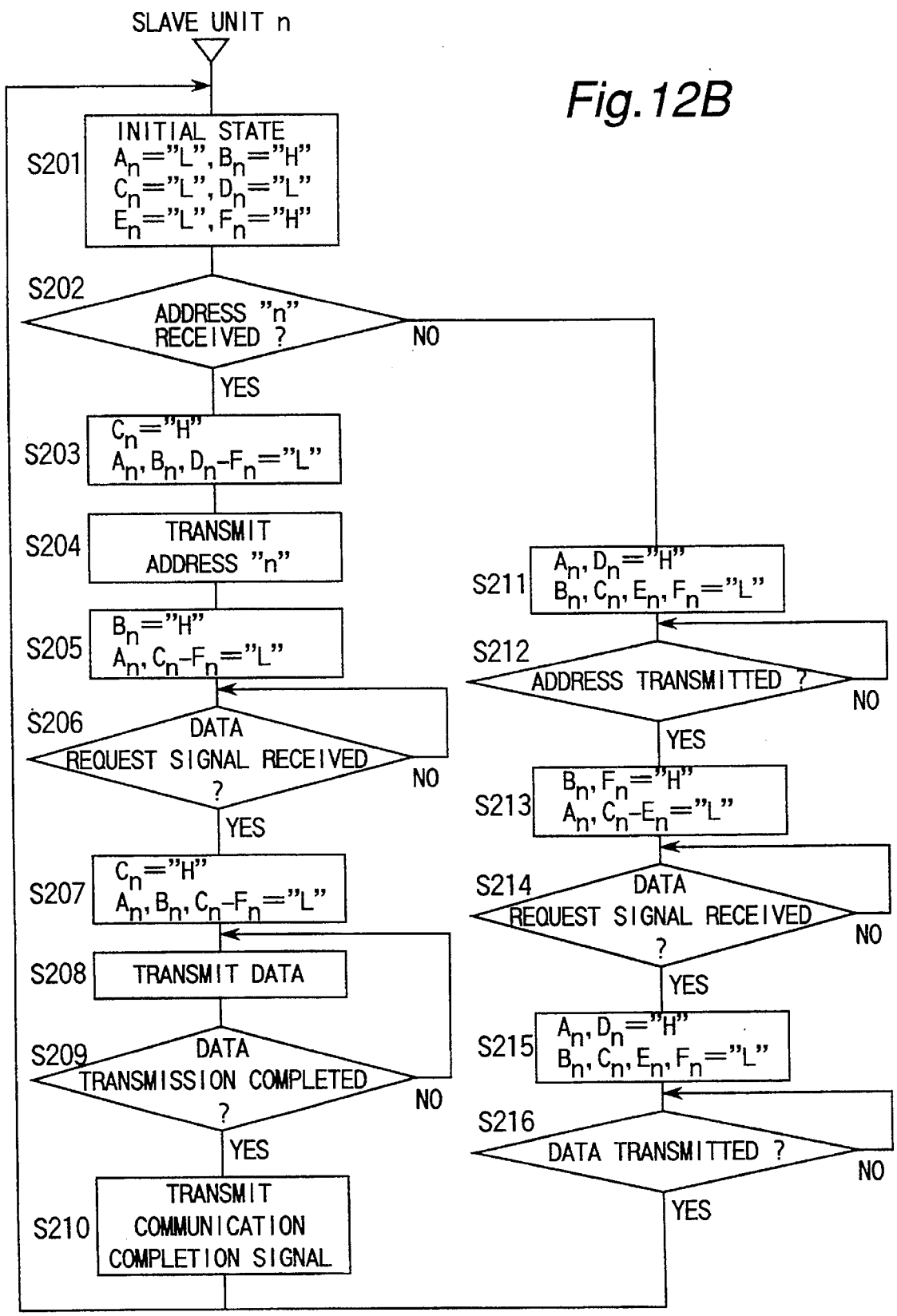

FIG. 12A shows the operation of the optical signal transmitter-receiver unit of the first slave unit 1.

Then a selecting operation in the present embodiment system will be described below with reference to FIGS. 13 and 14B. The selecting operation is an operation to designate the slave optical signal transmitter-receiver unit that the master optical signal transmitter-receiver unit desires to communicate with and transmit data to the designated slave optical signal transmitter-receiver unit from the master optical signal transmitter-receiver unit.

In its initial state, the optical signal transmitter-receiver unit 3 of the master unit 8 is in the receive mode, with the microcomputer 7A turning the control terminal A to the H level and turning the control terminal B to the L level. On the other hand, with the microcomputer 7B of the optical signal transmitter-receiver unit 4 of the slave unit m (m=1, 2, ... , n, ... ) turning the terminal Bm and the terminal Fm to the H level and turning the other terminals to the L level as shown in FIG. 14 (step S501), the optical signal transmitter-receiver unit 4 of the slave unit m is in the condition in which it is able to receive the transmission data from the optical signal transmitter-receiver unit 3 of the master unit 8 and also forward the data from the master optical signal transmitter-receiver unit to the succeeding slave optical signal transmitter-receiver unit.

Figure 13:
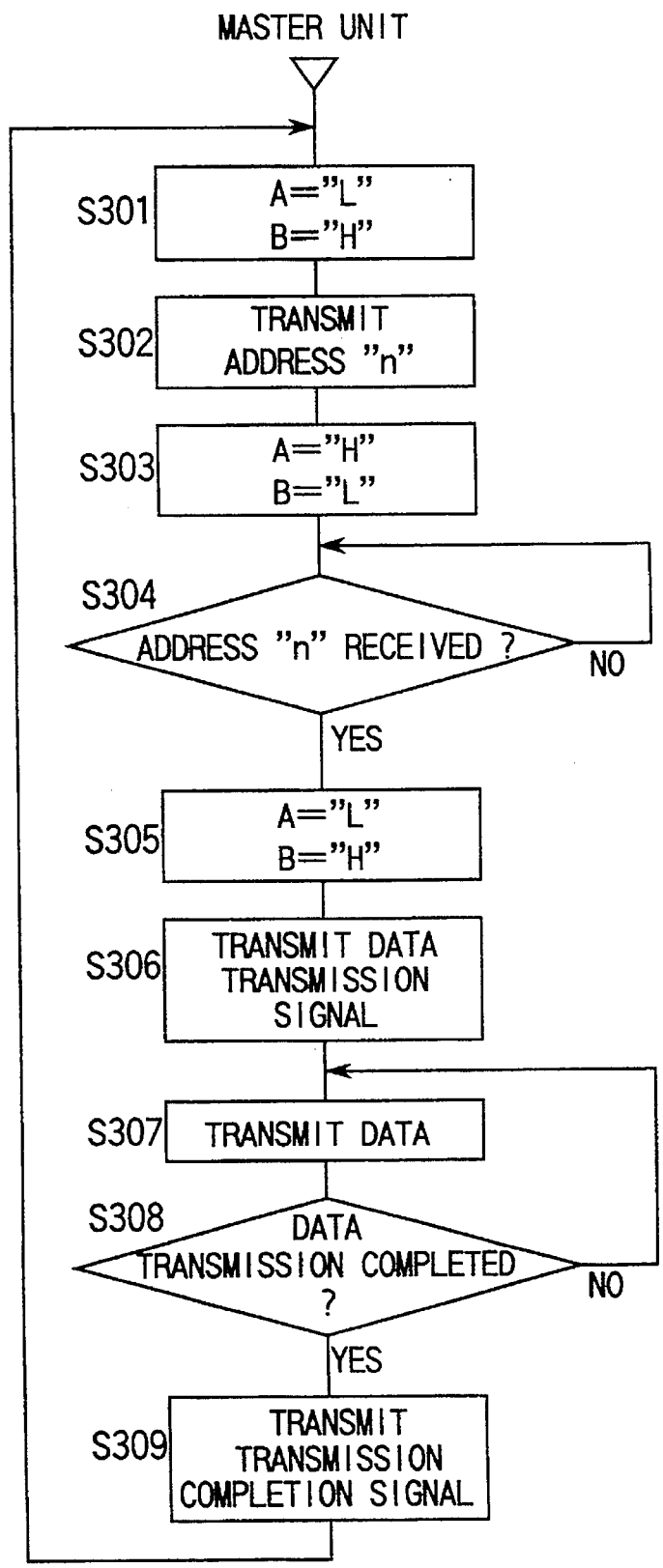

When the optical signal transmitter-receiver unit 3 of the master unit 8 starts the selecting operation for the optical signal transmitter-receiver unit 4 of the slave unit n, the optical signal transmitter-receiver unit 3 of the master unit 8 firstly makes the control terminal A of the microcomputer 7A have the L level and makes the control terminal B have the H level in step S301 of FIG. 13. With this operation, the optical signal transmitter-receiver unit 3 of the master unit 8 gets ready to transmit, and then outputs the address data to the optical signal transmitter-receiver unit 4 of the slave unit n (step S302). Then the optical signal transmitter-receiver unit 3 of the master unit 8 again makes the terminal A have the H level, makes the terminal B have the L level (step S303), and waits for a response from the optical signal transmitter-receiver unit 4 of the slave unit n (step S304).

On the other hand, upon confirming that the address data transmitted from the optical signal transmitter-receiver unit 3 of the master unit 8 coincides with its own address (step S502), the optical signal transmitter-receiver unit 4 of the slave unit n makes the control terminal Cn have an H level, and makes the other control terminals have an L level (step S503). As a result, the optical signal transmitter-receiver unit 4 of the slave unit n is ready to transmit to the optical signal transmitter-receiver unit 3 of the master unit 8, and then transmits the address data (step S504). Then the microcomputer 7B of the optical signal transmitter-receiver unit 4 of the slave unit n turns the control terminal Bn to the H level, and turns the other control terminals to the L level (step S505) so that the optical signal transmitter-receiver unit 4 of the slave unit n gets ready to receive instructions from the optical signal transmitter-receiver unit 3 of the master unit 8.

Upon confirming that the transmitted address data does not coincide with its own address in step S502, the microcomputer 7B of the optical signal transmitter-receiver unit 4 of the slave unit n turns the terminal An and Dn to an H level, and turns the other terminals to an L level (step S509). With this operation, the optical signal transmitter-receiver unit 4 of the slave unit n is ready to transmit the address data received from the optical signal transmitter-receiver unit 4 of its succeeding slave unit to the optical signal transmitter-receiver unit 3 of the master unit 8.

Upon receiving the address data from the optical signal transmitter-receiver unit 4 of the slave unit n in step S304, the optical signal transmitter-receiver unit 3 of the master unit 8 makes the terminal A have an L level, makes the terminal B have an H level (step S305), and then transmits a data transmission signal (step S306). Subsequently, the optical signal transmitter-receiver unit 3 of the master unit 8 continuously transmits data to the optical signal transmitter-receiver unit 4 of the slave unit n (step S307). When the data transmission is completed (step S308), the optical signal transmitter-receiver unit 3 of the master unit 8 transmits the communication completion signal (step S309), and returns to the initial state.

Upon receiving the transmission data from the optical signal transmitter-receiver unit 3 of the master unit 8 in step S507, the optical signal transmitter-receiver unit 4 of the slave unit n confirms the communication completion signal from the optical signal transmitter-receiver unit 3 of the master unit in step S508, and upon confirming that the data transmission from the optical signal transmitter-receiver unit 3 of the master unit is completed (step S508), the optical signal transmitter-receiver unit 4 of the slave unit n returns to the initial state.

Figure 14A:
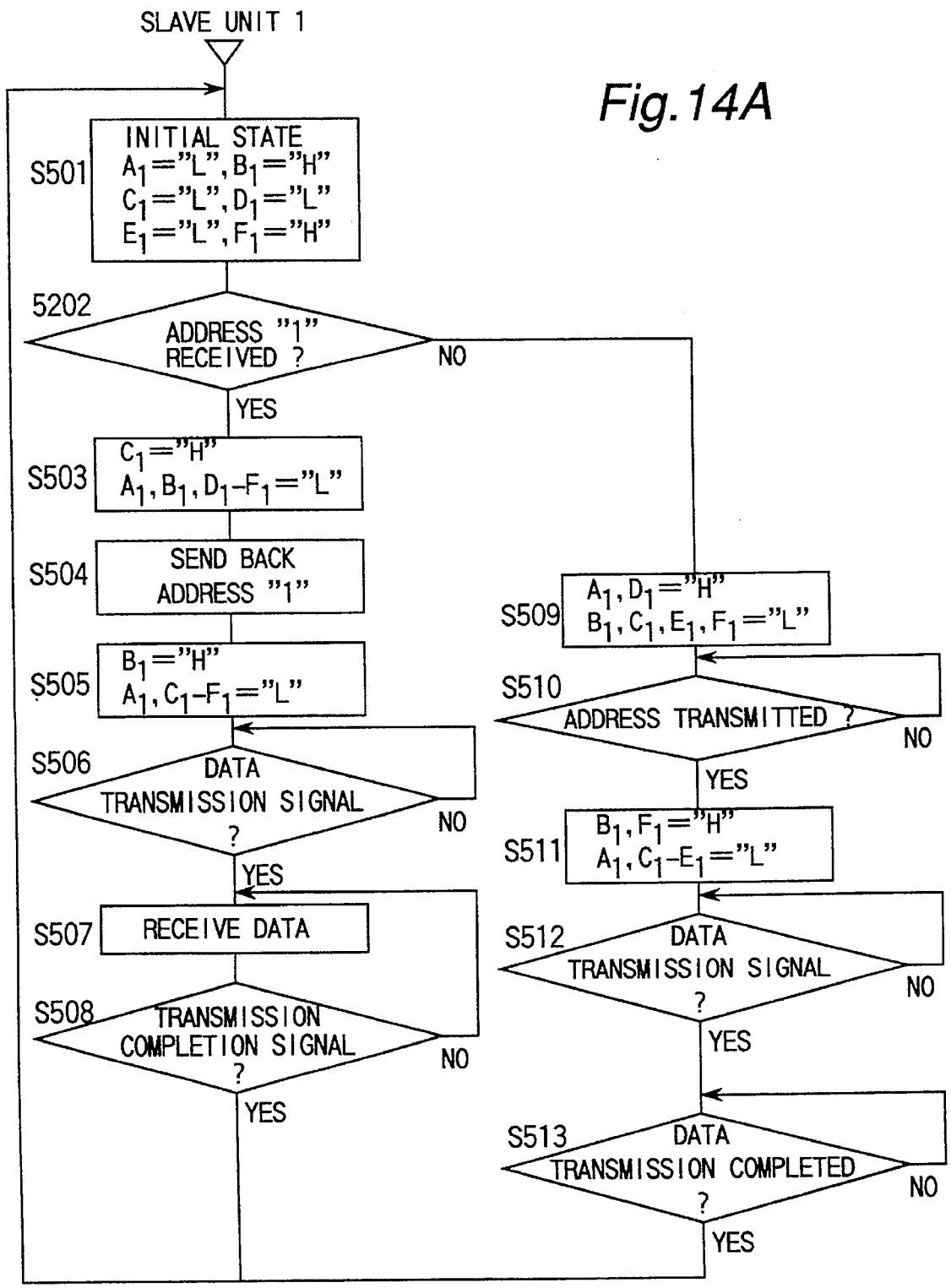
Figure 14B:
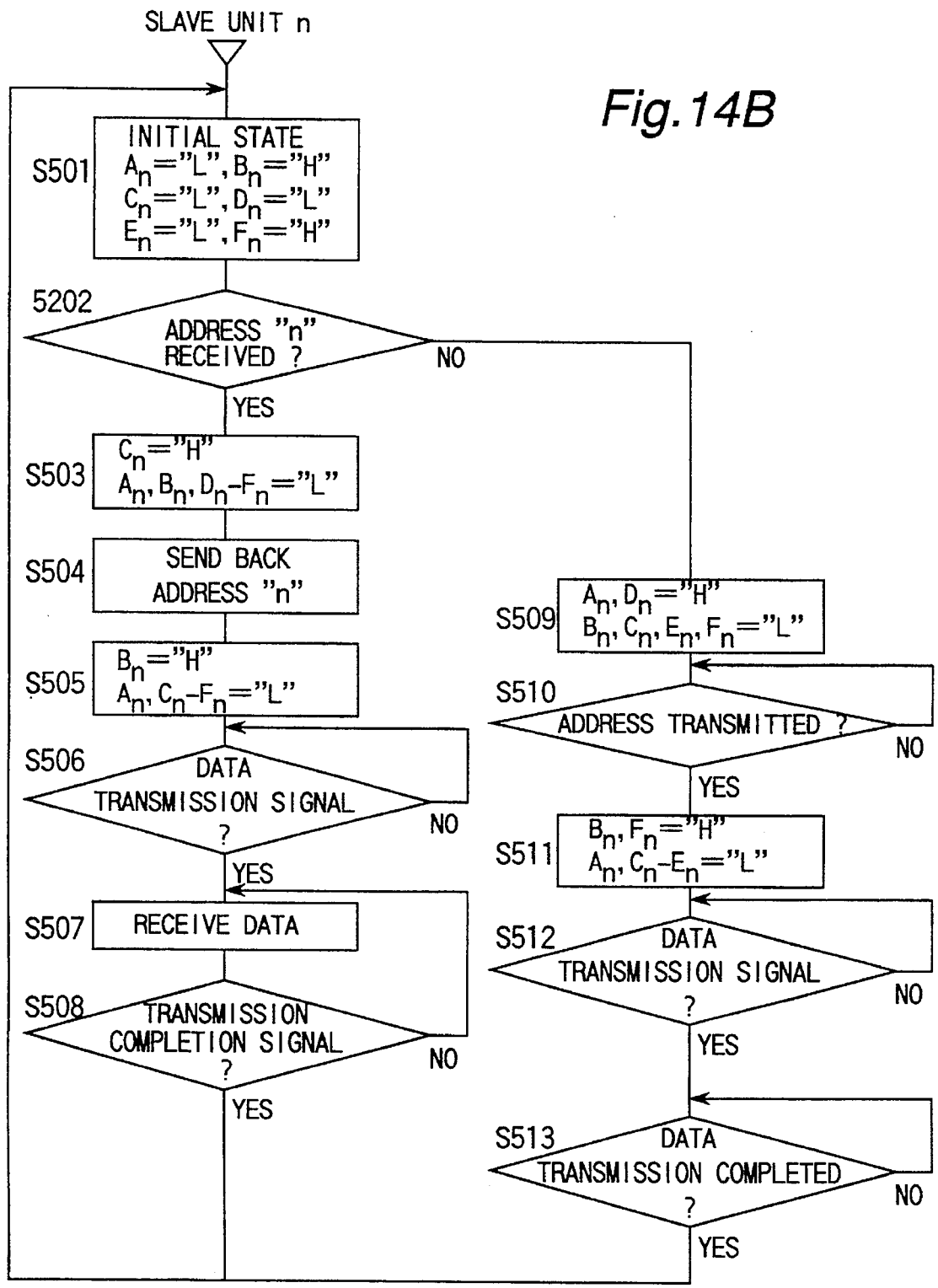

Note that FIG. 14A, which is similar to FIG. 14B, shows the operation of the optical signal transmitter-receiver unit 4 of the first slave unit 1.

With the aforementioned polling operation and selecting operation, the present embodiment system can achieve the optical communication between the master unit 8 and the desired slave unit n without branching by means of the branching device the optical signal to be transmitted through the optical fiber cable 1. Therefore, according to the present preferred embodiment, an inexpensive optical fiber transmission system which has a simple optical transmission structure and is easy to use can be provided. Although the optical connector 2 is the bidirectional type in the aforementioned preferred embodiment, the optical connector 2 does not need to be the bidirectional type. Although each of the microcomputers 7A and 7B serving as the control circuits includes the communication controller 14 in the aforementioned preferred embodiment, it is acceptable to separately provide a control circuit having a communication control function, aside from the microcomputers 7A and 7B.

The present invention can be applied not only to an optical fiber transmission system provided with a bidirectional fiber connector but also to an optical fiber transmission system provided with a unidirectional fiber connector.

Second Embodiment

Figure 18:
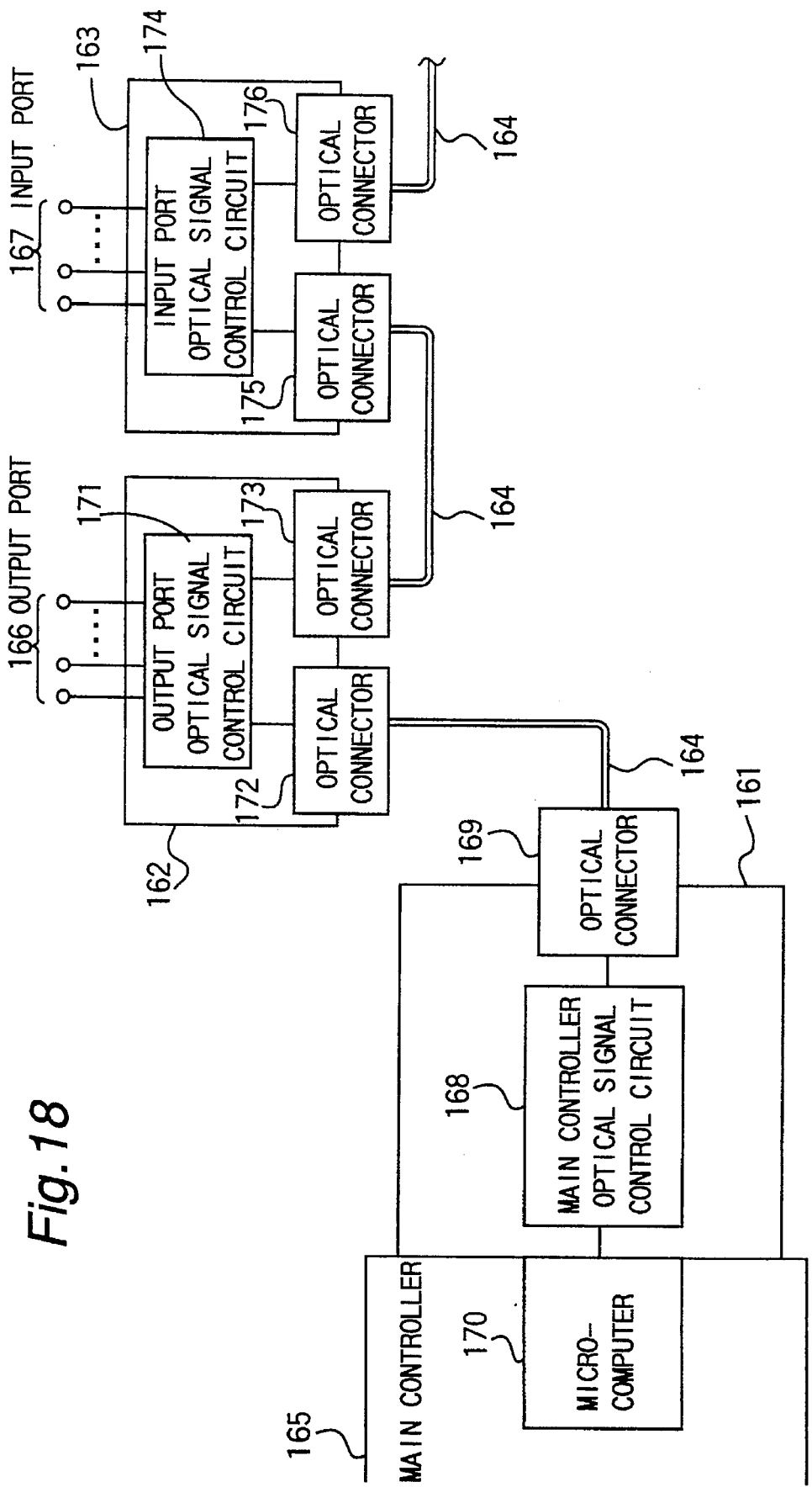
FIG. 18 is a block diagram of an optical fiber transmission system of a second embodiment of the present invention.

FIG. 18 is a block diagram of an optical fiber transmission system according to a second embodiment.

The present optical fiber transmission system is essentially composed of: a main controller optical signal transmitter-receiver unit 161 connected to a main controller 165 in any of household electric appliances, information apparatuses, production facilities, and the like; a plurality of output port optical signal transmitter-receiver units 162 (only one output port transmitter-receiver unit is shown as a representative in FIG. 18) connected to respective output ports 166; a plurality of input port optical signal transmitter-receiver units 163 (only one input port transmitter-receiver unit is shown as a representative in FIG. 18) connected to respective input ports 167; and optical fibers 164 provided for connection between the optical signal transmitter-receiver units 161, 162, and 163.

Obviously, the main controller optical signal transmitter-receiver unit 161 and the output/input port optical signal transmitter-receiver units 162, 163 form a master-slave system.

Unlike the first embodiment wherein the communication control for the master and slave optical signal transmitter-receiver units is performed by their respective microcomputers, the second embodiment uses only one microcomputer connected to the main controller optical signal transmitter-receiver unit (master optical signal transmitter-receiver unit), and the input/output port optical signal transmitter-receiver units (slave optical signal transmitter-receiver units) are under control of that microcomputer, as described in detail below.

The main controller optical signal transmitter-receiver unit 161, the output port optical signal transmitter-receiver units 162, 162, . . . , and the input port optical signal transmitter-receiver units 163, 163, are serially connected by way of the optical fibers 164.

The main controller optical signal transmitter-receiver unit 161 has a main controller optical signal control circuit 168 connected to a microcomputer 170 of the main controller 165, and an optical connector 169 connected to the optical fiber 164. Each of the output port optical signal transmitter-receiver units 162 has an output port optical signal control circuit 171 connected to the output port 166, and two optical connectors 172 and 173 connected to the optical fibers 164 and 164. Similarly, each input port optical signal transmitter-receiver unit 163 has an input port optical signal control circuit 174 connected to the input port 167, and two optical connectors 175 and 176 connected to the optical fibers 164 and 164.

Figure 19:
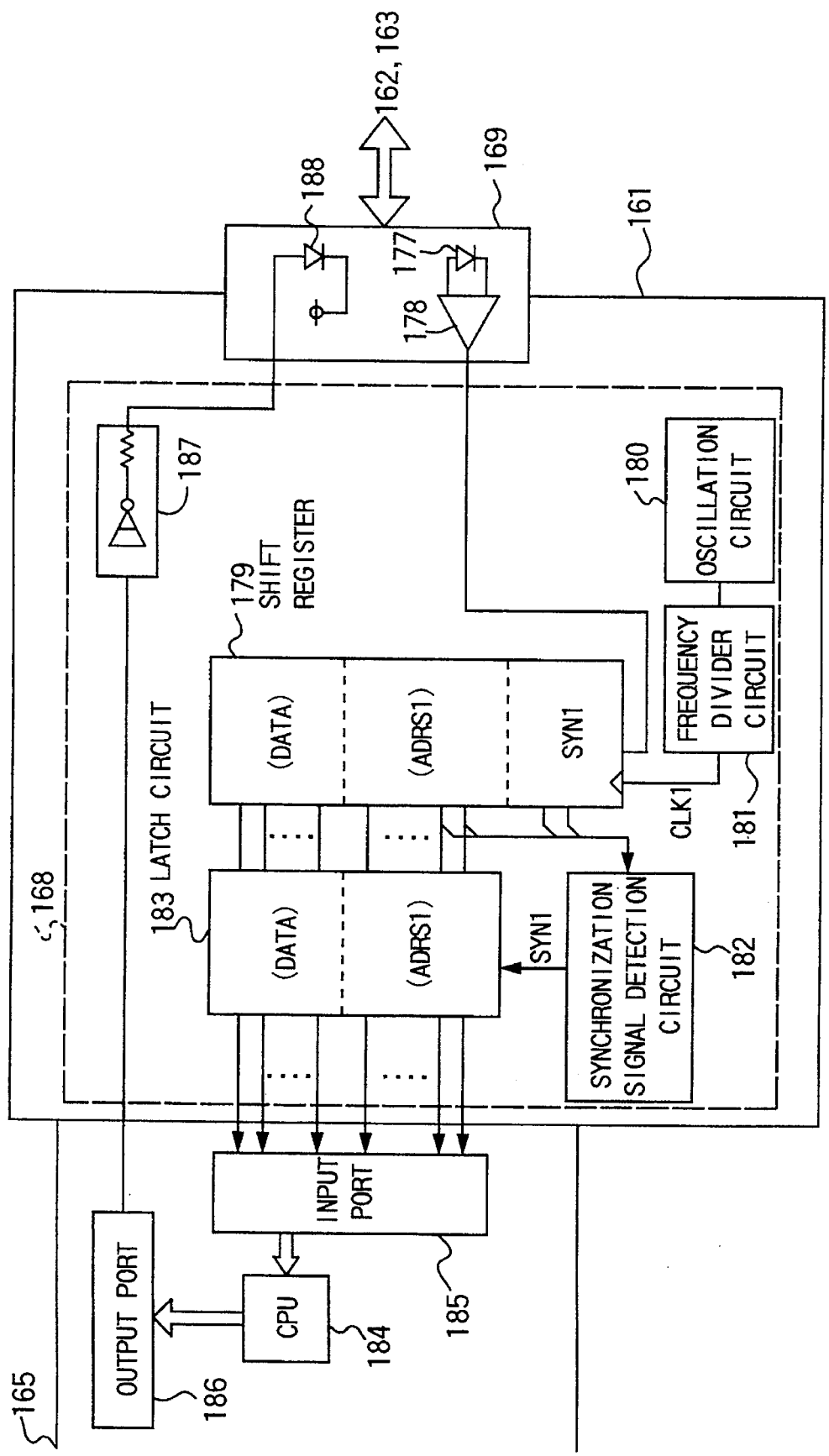
FIG. 19 is a detailed block diagram showing a main controller optical signal transmitter-receiver unit and an optical connector shown in FIG. 18.

FIG. 19 is a block diagram of the main controller optical signal transmitter-receiver unit 161. The following describes the construction of the main controller optical signal transmitter-receiver unit 161 with reference to FIG. 19 through explanation of the following operations performed by the main controller optical signal transmitter-receiver unit 161: receiving of input data from the input port 167, and transmission of output data to the output port 166 and a control signal to the input port optical signal transmitter-receiver unit 163.

First, the input data receiving operation is performed as follows.

A serial optical signal transmitted by way of the optical fiber 164 is converted into a serial electric signal by a light receiving element 177 of the optical connector 169, and then amplified in the amplifier 178. The serial electric signal is inputted to a shift register 179 and converted into a parallel electric signal. A clock signal CLK1 for the shift register 179 is generated by frequency-dividing an output of an oscillator circuit 180 by a frequency divider circuit 181.

A serial signal transmitted from the input port 167 includes input data, address data ADRS1, and a synchronization signal SYN1 as shown in FIG. 22. Then, the synchronization signal SYN1 in the parallel electric signal formed by converting the serial electric signal by the shift register 179 is detected by a synchronization signal detection circuit 182. Then the input data and the address data ADRS1 of the parallel electric signal are latched in a latch circuit 183 upon the detection of the synchronization signal SYN1.

A CPU (central processing unit) 184 constituting the microcomputer 170 of the main controller 165 inputs the input data and the address data ADRS1 latched in the latch circuit 183 into an input port 185. Then, confirmation of the address data ADRS1 is performed by the CPU 184, and receiving of the input data is thereby completed.

Next, transmission of the output data and the control signal from the main controller optical signal transmitter-receiver unit 161 is executed as follows.

The CPU 184 of the main controller 165 transmits the serial electric signal including the input data or the control signal via an output port 186 to a light emitting element drive circuit 187 of the main controller optical signal transmitter-receiver unit 161. Then the light emitting element drive circuit 187 drives a light emitting element 188 in the optical connector 169 based on the serial electric signal, whereby the electric signal is converted into a serial optical signal, and then transmitted by way of the optical fiber 164. In this way, the transmission of the output data or the control signal is completed.

Figure 20:
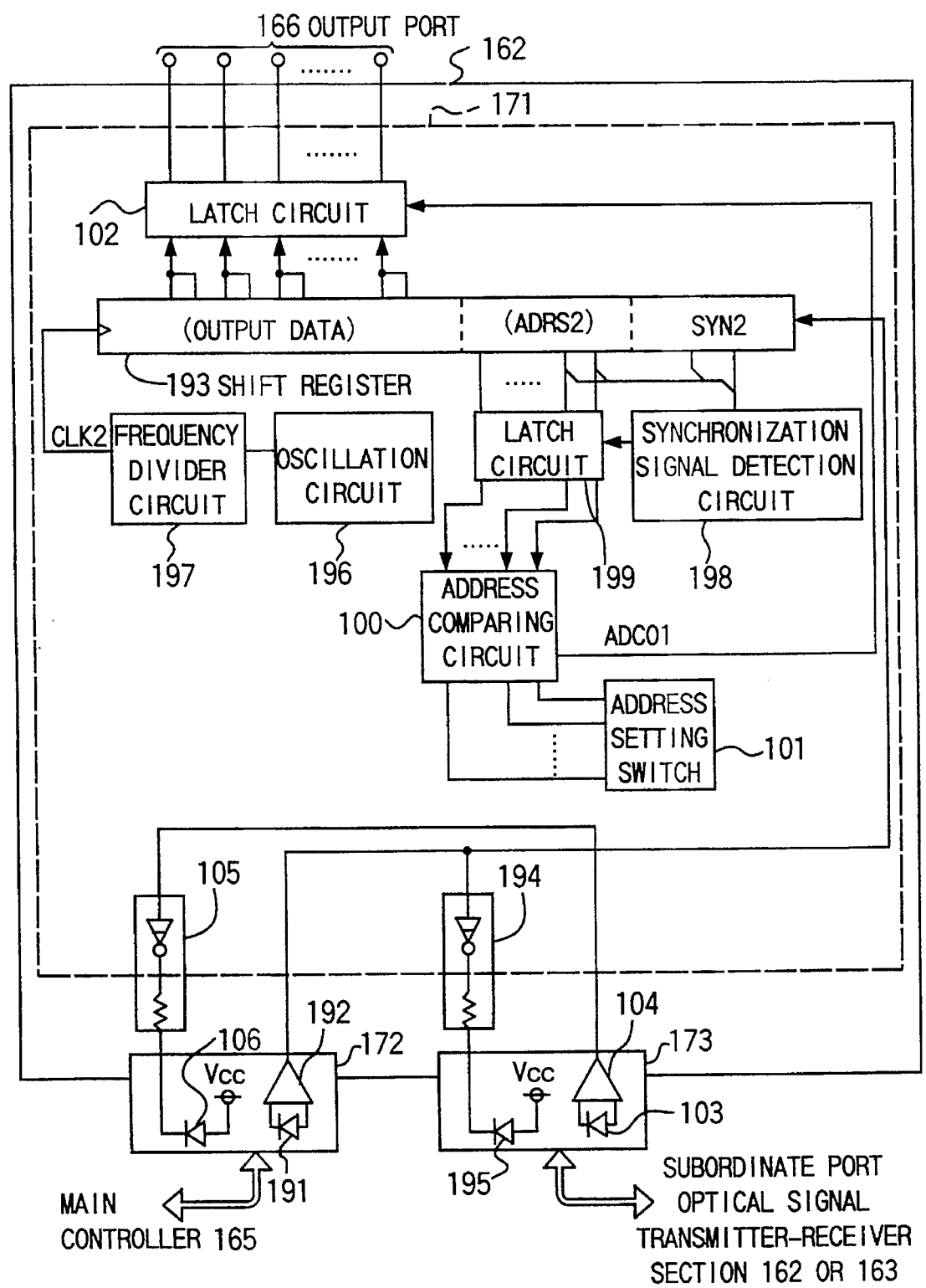
FIG. 20 is a detailed block diagram showing an output port optical signal transmitter-receiver unit and an optical connector shown in FIG. 18.

FIG. 20 shows a block diagram of the output port optical signal transmitter-receiver unit 162. The following describes the construction of the output port optical signal transmitter-receiver unit 162 through the explanation of a receiving operation of output data from the main controller 165 executed by the output port optical signal transmitter-receiver unit 162 with reference to FIG. 20.

A serial optical signal including output data transmitted from the main controller optical signal transmitter-receiver unit 161 is converted into a serial electric signal by a light receiving element 191 of the optical connector 172, and then amplified in an amplifier 192. The serial electric signal is inputted to a shift register 193 and converted into a parallel electric signal. Meanwhile, the serial electric signal is also inputted to a light emitting element drive circuit 194 for driving a light emitting element 195 of the other optical connector 173, converted into a serial optical signal by the light emitting element 195 driven by the light emitting element drive circuit 194, and then transmitted to an input port optical signal transmitter-receiver unit 163 or an output port optical signal transmitter-receiver unit 162 located in a position subordinate to that of the current output port optical signal transmitter-receiver unit 162 (either unit 163 or 162 referred to as a subordinate port optical signal transceiver-receiver unit hereinafter).

A clock signal CLK2 for the shift register 193 is generated by frequency-dividing an output of an oscillator circuit 196 in a frequency divider circuit 197.

The serial optical signal transmitted from the main controller 165 includes not only the output data but also a synchronization signal SYN2 and address data ADRS2 of the output port 166 to which the output data should be transmitted. Then the synchronization signal SYN2 in the parallel electric signal resulting from the serial optical signal is detected by a synchronization signal detection circuit 198. Then the address data ADRS2 of the parallel electric signal is latched in a latch circuit 199 upon the detection of the synchronization signal SYN2.

An address comparing circuit 100 compares the address data ADRS2 latched in the latch circuit 199 with address data set by an address setting switch 101. When determining that both the address data coincide with each other, the address comparing circuit 100 outputs an address coincidence signal ADC01 to a further latch circuit 102. Then the output data of the parallel electric signal is latched in the latch circuit 102, and then transmitted to the output port 166. The reception of the output data is thus completed.

Furthermore, to the second optical connector 173 of the output port optical signal transmitter-receiver unit 162 is transmitted a serial optical signal from the subordinate port optical signal transceiver-receiver unit 162 or 163 by way of the optical fiber 164. The serial optical signal is converted into a serial electric signal by a light receiving element 103, then amplified in an amplifier 104, and then transmitted to a further light emitting element drive circuit 105. Then the electric signal is converted back into the serial optical signal by a light emitting element 106 in the first optical connector 172 driven by the light emitting element drive circuit 105 based on the serial electric signal, and the optical signal is then transmitted to the main controller 165 by way of the optical fiber 164.

In other words, the serial optical signal sent from the subordinate port optical signal transceiver-receiver unit is forwarded through the current output port optical signal transmitter-receiver unit 162 to the main controller 165 as it is.

Figure 21:
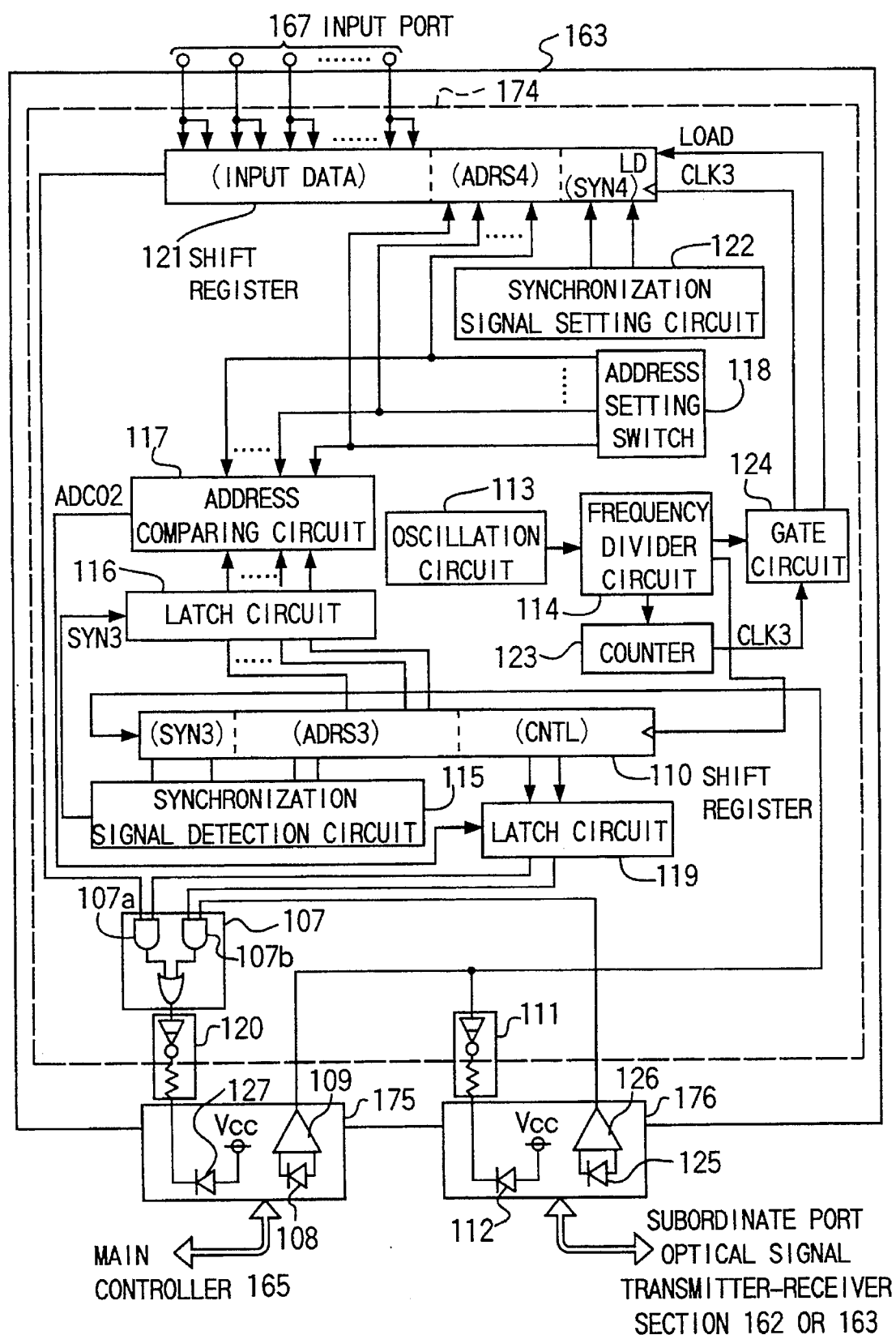
FIG. 21 is a detailed block diagram showing an input port optical signal transmitter-receiver unit and an optical connector shown in FIG. 18.

FIG. 21 is a block diagram of the input port optical signal transmitter-receiver unit 163. The following describes the construction of the input port optical signal transmitter-receiver unit 163 through explanation of the operations thereof to receive the control signal from the main controller 165 and to transmit input data to the main controller 165, referring to FIG. 21.

Before the operation of transmitting the input data is started by the input port optical signal transmitter-receiver unit 163, the main controller 165 outputs a transmission request signal composed of a control signal (a two-bit signal) CNTL, address data ADRS3, and a synchronization signal SYN3 (see FIG. 23) for requesting transmission of the input data from a specified input port optical signal transmitter-receiver unit 163. The control signal CNTL is a signal for controlling a transmission line control circuit 107 of the input port signal control circuit 174 connected to the destination input port 167 which is solicited for transmission, and the address data ADRS3 is data for designating the address of the destination input port 167.

The transmission request signal is converted into a serial optical signal main and transmitted by the controller optical signal transmitter-receiver unit 161, and then received by the optical connector 175 of each input port optical signal transmitter-receiver unit 163. In the optical connector 175, the optical signal is converted into a serial electric signal by a light receiving element 108 and then amplified in an amplifier 109. The serial electric signal is inputted to a shift register 110 and converted into a parallel electric signal. Meanwhile, the serial electric signal is also inputted to a light emitting element drive circuit 111, and then converted back into the serial optical signal by a light emitting element 112 of the second optical connector 176 driven by the light emitting element drive circuit 111, and then transmitted from the optical connector 176 to the subordinate port optical signal transceiver-receiver unit.

A clock signal CLK3 for the shift register 110 is generated by an oscillator circuit 113 and a frequency divider circuit 114.

When the synchronization signal SYN3 of the parallel electric signal from the shift register 110 is detected by a synchronization signal detection circuit 115, the address data ADRS3 of the parallel electric signal is latched in a latch circuit 116. Then the address data ADRS3 latched in the latch circuit 116 is compared with address data ADRS4 set by an address setting switch 118 by an address comparing circuit 117. When the address data ADRS3 and ADRS4 coincide with each other, an address coincidence signal ADCO2 is outputted from the address comparing circuit 117. Then, upon receipt of the address coincidence signal ADCO2, the control signal CNTL of the parallel electric signal is latched in a further latch circuit 119.

Subsequently, controlled by the control signal CNTL latched in the latch circuit 119, the transmission line control circuit 107 switches the transmission line of the serial electric signal from a "subordinate data transmission line" which is a normal mode to an "input data transmission line". In other words, the transmission line control circuit 107 switches the optical data transmission direction in accordance with the operation mode of the optical signal transmitter-receiver unit, similar to the optical fiber switching circuit in the first embodiment. When the transmission line is switched to the "input data transmission line" in a manner as described hereinafter, input data from the input port 167 is transmitted to the main controller 165 by the input port optical signal transmitter-receiver unit 163.

In more detail, assuming that the content of the control signal CNTL is (0, 1), when both the address data ADRS3 and ADRS4 coincide with each other, the control signal (0, 1) latched in the latch circuit 119 is outputted as a transmission line setting signal (input data transmission mode). Then an AND gate 107a of the transmission line control circuit 107 is turned "on" to output the serial electric signal including the input data from the shift register 121 to a light emitting element drive circuit 120.

It is to be noted that the serial electric signal from the shift register 121 is formed by adding the address data ADRS4 from the address setting switch 118 and the synchronization signal SYN4 from a synchronization signal setting circuit 122 to the input data from the input port 167.

As a clock signal for the shift register 121, the clock signal CLK3 from the frequency divider circuit 114 is transmitted by a gate circuit 124.

A LOAD signal for making the shift register 121 take in and latch the input data from the input port 67, the address data ADRS4 from the address setting switch 118, and the synchronization signal SYN4 from the synchronization signal setting circuit 122 is outputted from the gate circuit 124 when a counter 123 finishes counting clock pulses the number of which corresponds to a period in which one unit of the serial electric signal composed of the input data, the address data, and the synchronization signal is loaded into the shift register 121.

On the other hand, when the address data ADRS3 and ADRS4 do not coincide with each other, the control signal CNTL from the main controller 165 is not latched in the latch circuit 119, and a transmission line setting signal (1, 0) is continuously outputted from the latch circuit 119 (subordinate data transmission mode). This is a normal state of the input port optical transmitter-receiver unit 163. Then an AND gate 107b of the transmission line control circuit 107 is turned on to output to the light emitting element drive circuit 120 a serial electric signal formed by converting the serial optical signal from the subordinate port optical signal transceiver-receiver unit by a light receiving element 125 and an amplifier 126 of the optical connector 176.

The light emitting element drive circuit 120 drives a light emitting element 127 of the optical connector 175 upon receipt of the serial electric signal (see FIG. 22) from the shift register 121 or the amplifier 126 to convert the electric signal into a serial optical signal and transmit the optical signal to the main controller 165 by way of the optical fiber 164.

In other words, when the address data included in the transmission request signal from the main controller 165 and the address data set by the address setting switch 118 coincide with each other, the input port optical signal transmitter-receiver unit 163 transmits the input data from the connected input port 167 toward the main controller 165. Conversely, when they do not coincide with each other, the input port optical signal transmitter-receiver unit 163 forwards to the main port optical signal transmitter-receiver unit 161 input data, as it is, which is transmitted via the subordinate port optical signal transceiver-receiver units from another input port optical signal transmitter-receiver unit 163 where coincidence of the address data takes place.

The synchronization signal detection circuits 182, 198, and 115 are required to always observe the last bits of the serial electric signal successively loaded into the respective shift registers 179, 193, and 110 to check whether they are of the synchronization signal. In order to achieve the above-mentioned operation with the use of a synchronization signal having a small number of bits, the following arrangement is adopted in the present preferred embodiment.

In detail, when the input data is loaded into the shift register 121 in a manner as shown in FIG. 21, each bit of the input data is loaded into consecutive two bits of the shift register 121. In addition, when the address data is set by the address setting switch 118, each bit of the actual address data is used repetitively as consecutive two bits (when, for example, the actual address data represents "0, 1, 0, 1", each bit is repeated so that a signal of "0, 0, 1, 1, 0, 0, 1, 1" is set). Thus, the least significant two bits of the input data and the address data taken in the shift register 121 exhibit a sequence of high-level signals of "1, 1" or low-level signals of "0, 0". In contrast, when the synchronization signal is set by the synchronization signal setting circuit 122, the actual synchronization signal is set as it is i.e., without repeating the bits.

It is to be noted that when the CPU 184 of the main controller 165 produces a serial electric signal, the signal is set by repeating twice each bit of the output data and address data consecutively.

The synchronization signal is added subsequent to the address data in the serial electric signal, as shown in FIGS. 22 and 23. Therefore, assuming that the synchronization signal represents "1, 0", the contents of the least significant two bits of the address data and the synchronization signal in the serial electric signal are as shown in FIG. 24A or 24B. Therefore, the synchronization signal detection circuits 182, 198, and 115 watch the contents of the least significant four bits in the shift registers 179, 193, and 110, and when a pattern as shown in FIG. 24A or 24B appears, they can determine that the synchronization signal is detected.

Thus the detection of the synchronization signal is achieved easily and speedily by means of a synchronization signal having a small number of bits.

Figure 25:
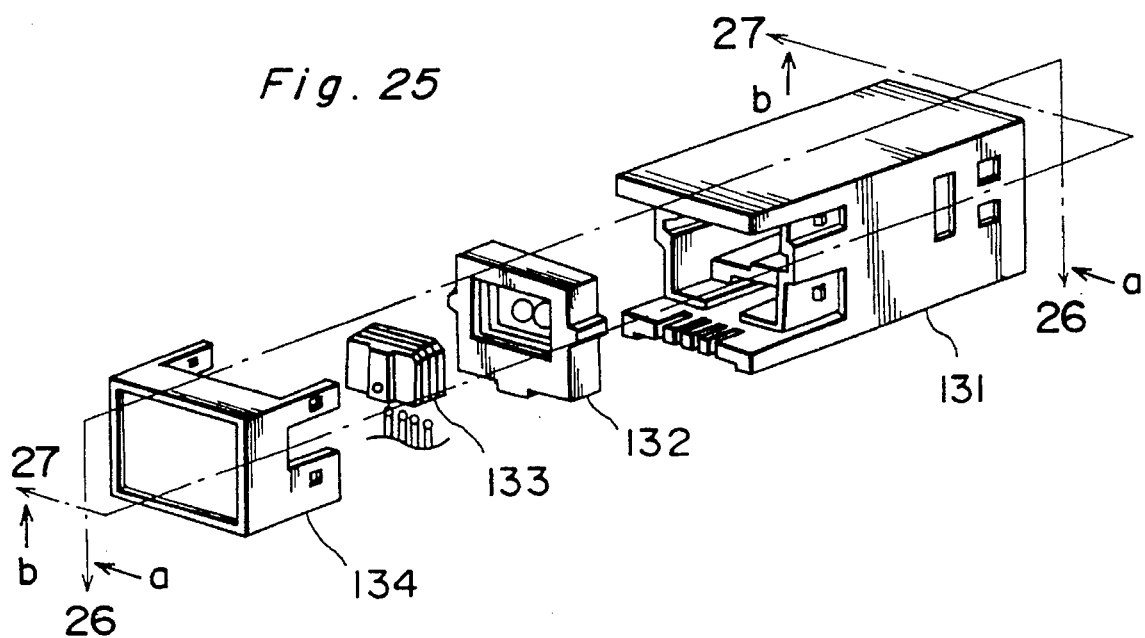
FIG. 25 is an exploded perspective view of the optical connector in the second embodiment system.
Figure 26:
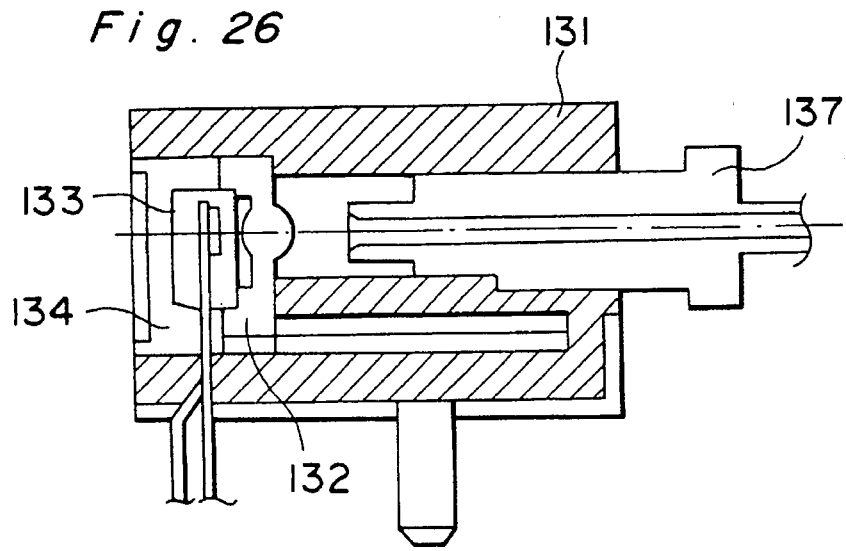
FIG. 26 is a sectional view taken along a line 26—26 and viewed in the direction a of FIG. 25.
Figure 27:
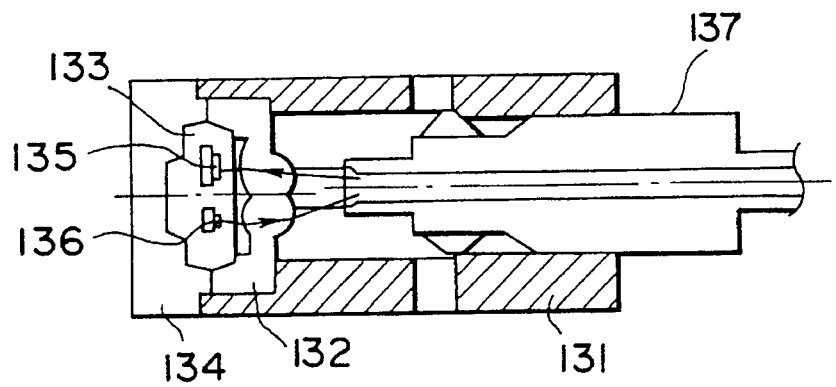
FIG. 27 is a sectional view taken along a line 27—27 and viewed in the direction b of FIG. 25.

The optical connectors 169, 172, 173, 175, and 176 (these will be represented by the optical connector 169 hereinafter) of the present preferred embodiment have an identical structure, and the structure is shown in FIGS. 25, 26 and 27. FIG. 25 is an exploded view, FIG. 26 is a sectional view taken along a line 26—26 and viewed in the direction of a in FIG. 25 and FIG. 27 is a sectional view taken along a line 27—27 and viewed in the direction of b in FIG. 25.

As shown in FIGS. 25–27, the optical connector 69 is composed mainly of a holder 131, a lens 132 fitted in the holder 131, an electronic device 133, and a rear lid 134.

As shown in FIGS. 19 and FIG. 27, the electronic device 133 has therein electric circuits such as a receiving photoelectric (light to electricity) converter section 135 including the light receiving element 177 of the optical connector 169, a sending photoelectric (electricity to light) converter section 136 including the light emitting element 188, and the amplifier 178. The device is placed and fixed in the holder 131, interposed between the lens 132 and the rear lid 134. In the present embodiment a photodiode is used as the light receiving element 177, and a light emitting diode is used as the light emitting element 188.

The lens 132 optimizes the optical coupling between both the photoelectric converter sections 135 and 136 built in the electronic device 133 and the optical fiber 164.

As shown in FIGS. 26 and 27, a connector 137 is fitted in the holder 131, and an end of the optical fiber 164 is inserted in the connector 137. Thus the serial optical signal transmitted by way of the optical fiber 164 is converged on the light receiving element 177 of the receiving photoelectric converter section 135 by the lens 132, while the serial optical signal from the light emitting element 188 of the sending photoelectric converter section 136 is converged on the end of the optical fiber 164 by the lens 132.

As described above, in the optical connector 169 of the present preferred embodiment, the light from the optical fiber 164 is conducted to the light receiving element 177 and the light from the light emitting element 188 is conducted to the optical fiber 164 by the lens 132. With the above-mentioned arrangement, there is no need to provide any light emitting diodes having various emission light spectrums, optical filters, two-way separation circuits, and so forth as those provided for the aforementioned conventional optical fiber transmission system, therefore achieving a simple optical transmission structure.

As described above, the optical fiber transmission system of the present preferred embodiment has the main controller optical signal transmitter-receiver unit 161 connected to the main controller 165, the output port optical signal transmitter-receiver unit 162 for receiving the serial optical signal including the address data from the main controller 165, and the input port optical signal transmitter-receiver unit 163 for receiving and sending the serial optical signal including the address data from and to the main controller 165. Further, the optical signal transmitter-receiver units 161, 162, and 163 are each provided with an optical connector having a light receiving element and a light emitting element. Then the optical signal transmitter-receiver units 161, 162, and 163 are merely connected serially via the respective optical connectors by way of the optical fiber 164.

Therefore, the present preferred embodiment requires no specific optical appliance such as an optical filter and a bidirectional separation circuit for specifying the opposite party of the optical fiber transmission. The above-mentioned arrangement allows a simple optical transmission structure to be achieved, thereby allowing a high optical coupling efficiency to be obtained.

The output port optical signal transmitter-receiver unit 162 transmits the serial signal transmitted from the main controller 165 to the subordinate port optical signal transceiver-receiver unit. During this operation, the output port optical signal transmitter-receiver unit 165 outputs the output data included in the serial signal to the output port 166 only when the address data included in the serial signal and the address data of the connected output port 166 coincide with each other.

With the above-mentioned arrangement, the main controller 165 can designate the output port of the other party and transmit the output data thereto without provision of any CPU in the output port optical signal transmitter-receiver unit 162 in the present preferred embodiment.

The input port optical signal transmitter-receiver unit 163 transmits the transmission request signal transmitted from the main controller 165 to the subordinate port optical signal transceiver-receiver unit. During this operation, when the address data included in the transmission request signal and the address data of the connected input port 167 coincide with each other, the input port optical signal transmitter-receiver unit 163 sets the transmission line to the "input data transmission line" based on the control signal included in the transmission request signal and converts the input data from the input port 167 into a serial optical signal, and then transmits the optical signal to the main controller 165. Conversely, when they do not coincide with each other, the transmission line is set to the "subordinate data transmission line" to forward the serial signal transmitted from the subordinate port optical signal transceiver-receiver unit to the main controller 165.

With the above-mentioned arrangement, the main controller 165 can designate the input port of the other party and receive the input data therefrom without provision of any CPU in the input port optical signal transmitter-receiver unit 163 in the present preferred embodiment.

Although each of the optical connectors 169, 172, 173, 175, and 176 of the above-mentioned preferred embodiment is a bidirectional type, each optical connector may be implemented by two unidirectional type optical connectors. Furthermore, each of the main controller optical signal control circuit 168, the output port optical signal control circuit 171, and the input port optical signal control circuit 174 may be fabricated into one chip in the form of an ASIC (application specific integrated circuit) or the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical fiber transmission system comprising a master optical signal transmitter-receiver unit, a plurality of slave optical signal transmitter-receiver units, and an optical fiber, said master and slave optical signal transmitter-receiver units being connected in series through said optical fibers, wherein:

(a) said master optical signal transmitter-receiver unit comprises:
    an optical connector connected with the optical fiber and having an optical signal receiving means for receiving an optical signal from the optical fiber and converting the optical signal to an electric signal and an optical signal transmitting means for converting an electric signal to an optical signal and outputting the optical signal to the optical fiber, the signal from the master optical signal transmitter-receiver unit including address data of a designated slave optical signal transmitter-receiver unit for communication with the master optical signal transmitter-receiver unit; and mode switching means connected with the optical connector for switching an operation mode of the master optical signal transmitter-receiver unit between a receive mode wherein the optical connector receives the optical signal from the optical fiber and a send mode wherein the optical connector transmits the optical signal to the optical fiber, (b) said slave optical signal transmitter-receiver units each comprise:

a first optical connector connected with the optical fiber which connects the present slave optical signal transmitter-receiver unit with the master optical signal transmitter-receiver unit when the present slave optical signal transmitter-receiver unit is immediately next to the master optical signal transmitter-receiver unit or with the preceding slave optical signal transmitter-receiver unit closer to the master optical signal transmitter-receiver unit when the present slave optical signal transmitter-receiver unit is not immediately next to the master optical signal transmitter-receiver unit, and having an optical signal receiving means for receiving an optical signal from the optical fiber and converting the optical signal to an electric signal and an optical signal transmitting means for converting an electric signal to an optical signal and outputting the optical signal to the optical fiber;

a second optical connector connected with the first optical connector and the optical fiber which connects the present slave optical signal transmitter-receiver unit with the following slave optical signal transmitter-receiver unit farther from the master optical signal transmitter-receiver unit, and having an optical signal receiving means for receiving an optical signal from the optical fiber and converting the optical signal to an electric signal and an optical signal transmitting means for converting an electric signal to an optical signal and outputting the optical signal to the optical fiber;

mode switching means connected with the first and second optical connectors for switching an operation mode of the slave optical signal transmitter-receiver unit between a first mode wherein the optical signal received by the first optical connector is transferred to the second optical connecter after conversion to the electric signal and then outputted to an associated optical fiber from the second optical connector after conversion to the optical signal and a second mode wherein the optical signal received by the second optical connector is transferred to the first optical connecter after conversion to the electric signal and then outputted to the associated optical fiber from the first optical connector after conversion to the optical signal; and address comparing means for comparing the address data transmitted from the master optical signal transmitter-receiver unit with address data of the present slave optical signal transmitter-receiver unit to decide whether the present slave optical signal transmitter-receiver unit is the designated slave optical signal transmitter-receiver unit, whereby the present slave optical signal transmitter-receiver unit outputs data of itself toward the master optical signal transmitter-receiver unit or takes in data from the master optical signal transmitter-receiver unit only when the address data coincide with each other.

2. The optical fiber transmission system as claimed in claim 1, wherein each optical connector has a holder, a connector which is fitted in the holder and in which the optical fiber is inserted, and an electronic device including the optical signal receiving and transmitting means and placed in opposition to said connector within the holder.

3. The optical fiber transmission system as claimed in claim 2, wherein each optical connector further includes a lens placed between the connector and the electronic device.

4. The optical fiber transmission system as claimed in claim 1, further comprising control means for controlling said mode switching means of said master and slave optical signal transmitter-receiver units.

5. The optical fiber transmission system as claimed in claim 4, wherein said control means comprise microcomputers connected with the associated mode switching means of said master and slave optical signal transmitter-receiver units respectively, and wherein said microcomputers of the master and slave optical signal transmitter-receiver units are also connected with a main computer and subcomputers or peripherals of the main computer for data communication therebetween, respectively.

6. The optical fiber transmission system as claimed in claim 5, wherein the mode switching means of the master optical signal transmitter-receiver unit comprise:

a first AND circuit whose output is connected with a data input terminal of the microcomputer and whose inputs are respectively connected with a first control terminal of the microcomputer and the optical signal receiving means of the optical connector; and a second AND circuit whose output is connected with a driving means for the optical signal transmitting means of the optical connector and whose inputs are respectively connected with a second control terminal of the microcomputer and a data output terminal of the microcomputer.

7. The optical fiber transmission system as claimed in claim 5, wherein the microcomputer of each slave optical signal transmitter-receiver unit has a central processing unit, storage means, a parallel I/O interface for controlling the mode switching means and a communication controller for controlling communication by way of the optical fiber as well as communication with an associated subcomputer or peripheral, said storage means, parallel I/O interface and communication controller being connected with said central processing unit.

8. The optical fiber transmission system as claimed in claim 7, wherein the mode switching means of each slave optical signal transmitter-receiver unit comprise:

a first OR circuit whose output is connected with a data input terminal of the communication controller and whose inputs are connected with outputs of first and second AND circuits, wherein inputs of said first AND circuit are connected with a first control terminal of the parallel I/O interface and the optical signal receiving means of said second optical connector, respectively, and inputs of said second AND circuit are connected with a second control terminal of the parallel I/O interface and the optical signal receiving means of said first optical connector;

a second OR circuit whose output is connected with a driving means for the optical signal transmitting means of said first optical connector and whose inputs are connected with outputs of third and fourth AND circuits, wherein inputs of said third AND circuit are connected with a third control terminal of the parallel I/O interface and a data output terminal of the communication controller, respectively, and inputs of said fourth AND circuit are connected with a fourth control terminal of the parallel I/O interface and the optical signal receiving means of said second optical connector; and a third OR circuit whose output is connected with a driving means for the optical signal transmitting means of said second optical connector and whose inputs are connected with outputs of fifth and sixth AND circuits, wherein inputs of said fifth AND circuit are connected with a fifth control terminal of the parallel I/O interface and the data output terminal of the communication controller, respectively, and inputs of said sixth AND circuit are connected with a sixth control terminal of the parallel I/O interface and the optical signal receiving means of said first optical connector.

9. The optical fiber transmission system as claimed in claim 4, wherein said master optical signal transmitter-receiver unit is connected with a main controller and said slave optical signal transmitter-receiver units are connected with their associated input ports and output ports, and wherein said control means comprise a microcomputer included in the main controller.

10. The optical fiber transmission system as claimed in claim 9, wherein the optical signal and the electric signal are serial signals and wherein:

(a) said mode switching means of the master optical signal transmitter-receiver unit comprises:
  a shift register for converting the serial electric signal transmitted from the optical connector into a parallel electric signal; and
  a latch circuit for latching input data included in the parallel electric signal, (b) said mode switching means of each of the slave optical signal transmitter-receiver units connected to respective output ports comprises:
  a shift register for converting the serial electric signal transmitted from the first optical connector into a parallel electric signal;
  an address data latch circuit for latching address data included in the parallel electric signal;
  said address comparing means outputting an address coincidence signal when the address data in the address data latch circuit coincide with the address data of this slave optical signal transmitter-receiver unit; and
  a data latch circuit for latching output data included in the parallel electric signal upon receiving the address coincidence signal, and (c) said mode switching means of each of the slave optical signal transmitter-receiver units connected to the respective input ports comprises:
  a first shift register for converting the serial electric signal transmitted from the first optical connector into a parallel electric signal;
  an address latch circuit for latching address data included in the parallel electric signal;
  said address comparing means outputting an address coincidence signal when the address data in the address data latch circuit coincide with the address data of this slave optical signal transmitter-receiver unit;
  a control signal latch circuit for, upon receiving the address coincidence signal, latching a control signal included in the parallel electric signal and outputting a transmission line setting signal;
  a second shift register for converting input data transmitted from the input port into a serial electric signal and latching the electric signal; and
  a transmission line control circuit for switching a transmission line in a normal state in which the serial electric signal from the second optical connector is transmitted to the first optical connector to a transmission line for transmitting the serial electric signal from the second shift register to the first optical connector based on the transmission line setting signal transmitted from the control signal latch circuit.

11. An optical fiber transmission system comprising a plurality of optical signal transmitter-receiver units provided in a master unit and a plurality of slave units and connected serially by way of a plurality of optical fibers for transmitting and receiving an optical signal by way of the plurality of optical fibers, thereby allowing an optical communication to be achieved between the master unit and the plural slave units, wherein:

(a) the optical signal transmitter-receiver unit connected to the master unit comprises:
  an optical connector which is connected to another optical signal transmitter-receiver unit by way of at least one of the plurality of optical fibers for converting an optical signal inputted from the at least one of the plurality of optical fibers into an electric signal and converting an electric signal into an optical signal to output the optical signal to the at least one of the plurality of optical fibers; and
  a send/receive mode switching circuit which is able to switch between a receive mode for receiving an electric signal from the optical connector and a transmit mode for transmitting an electric signal to the optical connector, and (b) the optical signal transmitter-receiver units connected to the respective slave units each comprise:
  first and second optical connectors connected respectively to a preceding-stage optical signal transmitter-receiver unit and a succeeding-stage optical signal transmitter-receiver unit by way of a respective one of the plurality of optical fibers for converting an optical signal inputted from the respective one of the plurality of optical fibers into an electric signal and converting an electric signal into an optical signal to output the optical signal to the respective one of the plurality of optical fibers; and
  a transmit mode switching circuit which is able to switch between a first transmit mode for receiving an electric signal from the first optical connector and transmitting the electric signal to the second optical connector and a second transmit mode for receiving an electric signal from the second optical connector and transmitting the electric signal to the first optical connector.

12. The optical fiber transmission system as claimed in claim 11, wherein the optical signal transmitter-receiver unit for the master unit comprises a control circuit for controlling the transmit/receive mode switching circuit to switch to the transmit mode to output an electric signal to the optical connector via the transmit/receive mode switching circuit, or to the receive mode to receive an electric signal from the optical connector via the transmit/receive mode switching circuit; and wherein the optical signal transmitter-receiver unit for each of the slave units comprises a control circuit capable of performing a first control operation for switching the transmit mode switching circuit between the first transmit mode and the second transmit mode, and a second control operation for making the transmit mode switching circuit select the first optical connector or the second optical connector through communication with the transmit mode switching circuit and making the transmit mode switching circuit output an electric signal to the first optical connector or to the second optical connector.

13. The optical fiber transmission system as claimed in claim 11, wherein the optical connector of each optical signal transmitter-receiver unit comprises a light receiving element for converting an optical signal from the at least one of the plurality of optical fibers into an electric signal and a light emitting element for converting an electric signal into an optical signal.

14. An optical fiber transmission system in which optical signal transmitter-receiver units connected respectively to a main controller, input ports, and output ports are serially connected by way of optical fibers for data communication between the main controller and any one of the input ports or the output ports through optical transmission, wherein;

(a) a main controller optical signal transmitter-receiver unit connected to the main controller comprises:

a first optical connector for converting a serial optical signal transmitted by way of the optical fibers into a serial electric signal, and converting a serial electric signal transmitted from the main controller into a serial optical signal to transmit the optical signal to the optical fibers; and a main controller optical signal control circuit for taking in input data included in the serial electric signal obtained through conversion in the first optical connector to transmit the input data to the main controller, and transmitting the serial electric signal from the main controller to the first optical connector, (b) the output port optical signal transmitter-receiver units connected to the output ports each comprise:

a second optical connector for converting a serial optical signal transmitted from the main controller by ray of the optical fibers into a serial electric signal, and converting a serial electric signal inputted thereto into a serial optical signal to transmit the optical signal to the main controller by way of the optical fibers;

a third optical connector for converting a serial optical signal transmitted from a subordinate optical signal transmitter-receiver unit by way of the optical fibers into a serial electric signal to transmit the electric signal to the second optical connector, and converting a serial electric signal inputted from the second optical connector into a serial optical signal to transmit the optical signal to a subordinate optical signal transceiver-receiver unit by way of the optical fibers; and an output port optical signal control circuit for transmitting output data included in the serial electric signal obtained through conversion in the second optical connector to the associated output port connected to the output port optical signal transmitter-receiver unit when address data included in the serial electric signal coincides with its own address data, and (c) the input port optical signal transmitter-receiver units connected to the input ports each comprise:

a fourth optical connector for converting a serial optical signal transmitted from the main controller by ray of the optical fibers into a serial electric signal, and converting a serial electric signal inputted thereto into a serial optical signal to transmit the optical signal to the main controller by way of the optical fibers;

a fifth optical connector for converting a serial optical signal transmitted from a subordinate optical signal transceiver-receiver unit by way of the optical fibers into a serial electric signal, and converting a serial electric signal inputted from the fourth optical connector into a serial optical signal to transmit the optical signal to the subordinate optical signal transceiver-receiver unit by ray of the optical fibers; and an input port optical signal control circuit for taking in input data from the input port connected thereto and converting the input data into a serial electric signal to transmit the electric signal to the fourth optical connector when address data included in the serial electric signal obtained through conversion in the fourth optical connector coincides with its own address data, and transmitting a serial electric signal transmitted from the fifth optical connector to the fourth optical connector when the address data do not coincide with each other.

15. The optical fiber transmission system as claimed in claim 14, wherein:

(a) the main controller optical signal control circuit comprises:

a first shift register for converting the serial electric signal transmitted from the first optical connector into a parallel electric signal; and a first latch circuit for latching input data included in the parallel electric signal, (b) each output port optical signal control circuit comprises:

a second shift register for converting the serial electric signal transmitted from the second optical connector into a parallel electric signal;

a second latch circuit for latching address data included in the parallel electric signal;

a first address comparing circuit for comparing the address data latched in the second latch circuit with address data of the output port optical signal transmitter-receiver unit, and outputting a first address coincidence signal when these address data coincide with each other; and a data latch circuit for latching output data included in the parallel electric signal upon receiving the first address coincidence signal; and (c) each input port optical signal control circuit comprises:

a third shift register for converting the serial electric signal transmitted from the fourth optical connector into a parallel electric signal;

a third latch circuit for latching address data included in the parallel electric signal;

a second address comparing circuit for comparing the address data latched in the third latch circuit with address data of the input port optical signal transmitter-receiver unit, and outputting a second address coincidence signal when these address data coincide with each other;

a control signal latch circuit for, upon receiving the second address coincidence signal, latching a control signal included in the parallel electric signal and outputting a transmission line setting signal;

a fourth shift register for converting input data transmitted from the input port into a serial electric signal and latching the electric signal; and a transmission line control circuit for switching a transmission line in a normal state in which the serial electric signal from the fifth optical connector is transmitted to the fourth optical connector to a transmission line for transmitting the serial electric signal from the fourth shift register to the fourth optical connector based on the transmission line setting signal transmitted from the control signal latch circuit.

16. The optical fiber transmission system as claimed in claim 14, wherein each of the first through fifth optical connectors comprises a light receiving element for converting a serial optical signal inputted thereto into a serial electric signal, and a light emitting element for converting a serial electric signal into a serial optical signal.

* * * * *